United States Patent
Shimazawa et al.

(10) Patent No.: US 8,374,060 B2
(45) Date of Patent: Feb. 12, 2013

(54) THERMALLY-ASSISTED MAGNETIC RECORDING METHOD FOR WRITING DATA ON A HARD DISK MEDIUM

(75) Inventors: Koji Shimazawa, Tokyo (JP); Tomohito Mizuno, Tokyo (JP); Hiroshi Kiyono, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 13/046,117

(22) Filed: Mar. 11, 2011

(65) Prior Publication Data

US 2012/0230169 A1 Sep. 13, 2012

(51) Int. Cl.
*G11B 11/00* (2006.01)

(52) U.S. Cl. .................................... 369/13.01

(58) Field of Classification Search .................. None
See application file for complete search history.

(56) References Cited

U.S. PATENT DOCUMENTS

| | | | |
|---|---|---|---|
| 2002/0119348 A1* | 8/2002 | Kudoh et al. | 428/694 ML |
| 2006/0024529 A1* | 2/2006 | Murakami | 428/810 |
| 2011/0002064 A1* | 1/2011 | Nakagawa et al. | 360/75 |
| 2011/0205862 A1* | 8/2011 | Kanbe et al. | 369/13.32 |
| 2011/0216435 A1* | 9/2011 | Shiimoto et al. | 360/59 |
| 2011/0235205 A9* | 9/2011 | Lu et al. | 360/59 |

OTHER PUBLICATIONS

Rottmayer et al., "Head-Assisted Magnetic Recording," *IEEE Transactions on Magnetics*, vol. 42, No. 10, Oct. 2006, pp. 2417-2421.
Sharrock et al., "Kinetic Effects in Coercivity Measurements," *IEEE Transactions on Magnetics*, vol. MAG-17, No. 6, Nov. 1981, pp. 3020-3022.
Tagawa et al., "Relationship Between High Density Recording Performance and Particle Coercivity Distribution," *IEEE Transactions on Magnetics*, vol. 27, No. 6, Nov. 1991, pp. 4975-4977.
Matsumoto et al., "Writing 40 nm marks by using a beaked metallic plate near-field optical probe," *Optics Letters*, vol. 31, No. 2, Jan. 2006, pp. 259-261.

* cited by examiner

*Primary Examiner* — Adam R Giesy
*Assistant Examiner* — Henok Heyi
(74) *Attorney, Agent, or Firm* — Oliff & Berridge, PLC

(57) ABSTRACT

A thermally-assisted magnetic recording method includes first and second steps. The first step applies heat to part of a hard disk medium and forms a moving high-temperature region in a magnetic recording layer of the hard disk medium. The high-temperature region is higher in temperature than a region therearound and has a temperature equal to or higher than the maximum coercivity vanishing temperature of a plurality of magnetic grains contained in the magnetic recording layer. At least one magnetic grain that is adjacent to the rear end of the high-temperature region in the direction of movement of the high-temperature region has a coercivity of a value other than 0. The second step applies a write magnetic field to the hard disk medium such that the write magnetic field applied to the at least one magnetic grain adjacent to the rear end of the high-temperature region is 3 kOe or smaller in magnitude.

17 Claims, 20 Drawing Sheets

THERMALLY-ASSISTED MAGNETIC RECORDING METHOD FOR WRITING DATA ON A HARD DISK MEDIUM

BACKGROUND OF THE INVENTION

1. Field of the Invention

The present invention relates to a thermally-assisted magnetic recording method where a write magnetic field and heat are applied to a hard disk medium to write data thereon, and also relates to a hard disk drive and a hard disk medium to which this recording method is applicable.

2. Description of the Related Art

Recently, hard disk drives have been improved in recording density, and magnetic heads and hard disk media of improved performance have been demanded accordingly. Among the magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a hard disk drive, the magnetic head is mounted on a slider that flies slightly above the surface of the hard disk medium.

A hard disk medium has a magnetic recording layer made of an aggregate of many microscopic magnetic grains. Each magnetic grain has a single-domain structure. A single recording bit of the hard disk medium is composed of a plurality of magnetic grains that align at least in the track width direction. For improved recording density, it is necessary to reduce asperities at the borders between adjoining recording bits. To achieve this, the magnetic grains must be made smaller. However, making the magnetic grains smaller causes the problem that the thermal stability of magnetization of the magnetic grains decreases with decreasing volume of the magnetic grains. To solve this problem, it is effective to increase the anisotropic energy of the magnetic grains. However, increasing the anisotropic energy of the magnetic grains leads to an increase in coercivity of the magnetic recording layer, and this makes it difficult to perform data writing with existing magnetic heads.

To solve the aforementioned problems, there has been proposed a technology so-called thermally-assisted magnetic recording. The technology uses a hard disk medium having a magnetic recording layer of high coercivity. When writing data, a magnetic field and heat are simultaneously applied to the area of the magnetic recording layer where to write data, so that the area rises in temperature and drops in coercivity for data writing.

In conventional recording methods using only magnetism, contributive factors to an increase in linear recording density have been dominated mainly by a large gradient of change in write magnetic field in the track direction. In addition to this, for thermally-assisted magnetic recording, a change in temperature occurring in the magnetic recording layer in the track direction due to heat applied to the hard disk medium and a change in coercivity occurring in the magnetic recording layer in the track direction due to the aforementioned temperature change are also contributive factors to an increase in linear recording density. Thermally-assisted magnetic recording is therefore considered to be highly effective in increasing the linear recording density.

For thermally-assisted magnetic recording, the gradient of the change in coercivity of the magnetic recording layer in the track direction is expressed by the product of the gradient of the change in coercivity with respect to the change in temperature and the gradient of the change in temperature with respect to the change in position, as described in, for example, "Robert E. Rottmayer et al; IEEE Transactions on Magnetics, Vol. 42, No. 10, October, 2006, p. 2417-2421". Therefore, it has conventionally been thought that a preferable property of the magnetic recording layer of a hard disk medium for use in thermally-assisted magnetic recording is a large gradient of the change in coercivity with respect to the change in temperature.

In practice, however, there is a problem that sufficient signal-to-noise ratios cannot be obtained at high linear recording densities even if a hard disk medium with a magnetic recording layer that exhibits a large gradient of the change in coercivity with respect to the change in temperature is used to perform thermally-assisted magnetic recording.

OBJECT AND SUMMARY OF THE INVENTION

It is an object of the present invention to provide a method for writing data on a hard disk medium, and more specifically, a thermally-assisted magnetic recording method capable of achieving high linear recording density and high signal-to-noise ratio, and to provide a hard disk drive and a hard disk medium to which this recording method is applicable.

The present invention provides a first and a second thermally-assisted magnetic recording method for writing data on a hard disk medium by applying a write magnetic field and heat to the hard disk medium. The hard disk medium has a magnetic recording layer. The magnetic recording layer contains a plurality of magnetic grains, and a grain boundary portion that is made of a nonmagnetic material and separates the plurality of magnetic grains from each other.

The first thermally-assisted magnetic recording method of the present invention includes the following first and second steps. The first step forms a moving high-temperature region in the magnetic recording layer by applying heat to part of the hard disk medium and moving the heat-receiving site in the hard disk medium. The high-temperature region is higher in temperature than a region therearound and has a temperature equal to or higher than the maximum value of coercivity vanishing temperatures of the plurality of magnetic grains. At least one of the magnetic grains that is adjacent to the rear end of the high-temperature region in the direction of movement of the high-temperature region has a coercivity of a value other than 0. The second step applies a write magnetic field to the hard disk medium such that the write magnetic field applied to the at least one of the magnetic grains adjacent to the rear end of the high-temperature region is 3 kOe (1 Oe equals 79.6 A/m) or smaller in magnitude. Note that the coercivity vanishing temperature of a magnetic grain is defined as the temperature at which the coercivity of a magnetic grain disappears in the process of increasing the temperature of the magnetic grain.

The second thermally-assisted magnetic recording method of the present invention includes the following first and second steps. The first step irradiates the hard disk medium with light in order to apply heat to part of the hard disk medium, and thereby forms a moving spot of the light on a surface of the hard disk medium. The second step applies a write magnetic field to the hard disk medium such that the write magnetic field applied to a predetermined position in the magnetic recording layer is 3 kOe or smaller in magnitude. The predetermined position is at a distance from a position immediately below the center of the spot in the magnetic recording layer in a direction opposite to the direction of movement of the spot. Here, the distance is expressed by MWW×(W1/W2)/2, where MWW is the effective track width of the hard disk medium, W1 is the diameter of the spot in the track direction, and W2 is the diameter of the spot in the track width direction. Note that the position immediately below the center of the spot refers to a position on a virtual straight line that passes through the center of the spot and that is perpendicular to the surface of the hard disk medium.

In the first or second thermally-assisted magnetic recording method of the present invention, the maximum absolute value of the gradient of the change in coercivity of the magnetic recording layer with respect to the change in temperature may fall within the range of 70 to 220 Oe/K (K stands for kelvin). In this case, the hard disk medium may further include a cap layer made of a ferromagnetic material. The extent of distribution of the coercivity vanishing temperatures of the plurality of magnetic grains may be 60 K or smaller. The cap layer has a coercivity vanishing temperature higher than the maximum value of the coercivity vanishing temperatures of the plurality of magnetic grains. Note that the coercivity vanishing temperature of the cap layer is defined as the temperature at which the coercivity of the cap layer disappears in the process of increasing the temperature of the cap layer.

The present invention provides a first and a second hard disk drive each of which includes a hard disk medium and a magnetic head. The hard disk medium has a magnetic recording layer. The magnetic recording layer contains a plurality of magnetic grains, and a grain boundary portion that is made of a nonmagnetic material and separates the plurality of magnetic grains from each other. The magnetic head moves relative to the hard disk medium and writes data on the hard disk medium by thermally-assisted magnetic recording.

In the first hard disk drive of the present invention, the magnetic head includes a magnetic pole for applying a write magnetic field to the hard disk medium, and a heating element for applying heat to the hard disk medium. The magnetic head applies heat to part of the hard disk medium using the heating element, and the heat-receiving site moves in the hard disk medium, whereby the magnetic head forms a moving high-temperature region in the magnetic recording layer. The high-temperature region is higher in temperature than a region therearound and has a temperature equal to or higher than the maximum value of coercivity vanishing temperatures of the plurality of magnetic grains. At least one of the magnetic grains that is adjacent to the rear end of the high-temperature region in the direction of movement of the high-temperature region has a coercivity of a value other than 0. The magnetic head applies a write magnetic field to the hard disk medium using the magnetic pole such that the write magnetic field applied to the at least one of the magnetic grains adjacent to the rear end of the high-temperature region is 3 kOe or smaller in magnitude.

In the second hard disk drive of the present invention, the magnetic head includes a magnetic pole for applying a write magnetic field to the hard disk medium, and a light generating element that generates light for applying heat to the hard disk medium. The magnetic head irradiates the hard disk medium with the light using the light generating element in order to apply heat to part of the hard disk medium, and thereby forms a moving spot of the light on the surface of the hard disk medium. The magnetic head applies a write magnetic field to the hard disk medium using the magnetic pole such that the write magnetic field applied to a predetermined position in the magnetic recording layer is 3 kOe or smaller in magnitude. The predetermined position is at a distance from a position immediately below the center of the spot in the magnetic recording layer in a direction opposite to the direction of movement of the spot. Here, the distance is expressed by MWW×(W1/W2)/2, where MWW is the effective track width of the hard disk medium, W1 is the diameter of the spot in the track direction, and W2 is the diameter of the spot in the track width direction.

In the first or second hard disk drive of the present invention, the maximum absolute value of the gradient of the change in coercivity of the magnetic recording layer with respect to the change in temperature may fall within the range of 70 to 220 Oe/K. In this case, the hard disk medium may further include a cap layer made of a ferromagnetic material. The extent of distribution of the coercivity vanishing temperatures of the plurality of magnetic grains may be 60 K or smaller. The cap layer has a coercivity vanishing temperature higher than the maximum value of the coercivity vanishing temperatures of the plurality of magnetic grains.

In the first or second hard disk drive of the present invention, the heating element or the light generating element may be an element that generates near-field light. In the first hard disk drive of the present invention, the magnetic pole may be disposed forward of the heating element along the direction of movement of the high-temperature region. In the second hard disk drive of the present invention, the magnetic pole may be disposed forward of the light generating element along the direction of movement of the spot.

The present invention provides a hard disk medium for data to be written thereon by thermally-assisted magnetic recording. The hard disk medium includes a magnetic recording layer and a cap layer. The magnetic recording layer contains a plurality of magnetic grains, and a grain boundary portion that is made of a nonmagnetic material and separates the plurality of magnetic grains from each other. The maximum absolute value of the gradient of the change in coercivity of the magnetic recording layer with respect to the change in temperature falls within the range of 70 to 220 Oe/K. The extent of distribution of coercivity vanishing temperatures of the plurality of magnetic grains is 60 K or smaller. The cap layer is made of a ferromagnetic material, and has a coercivity vanishing temperature higher than the maximum value of the coercivity vanishing temperatures of the plurality of magnetic grains.

According to the first thermally-assisted magnetic recording method or the first hard disk drive of the present invention, a moving high-temperature region is formed in the magnetic recording layer of the hard disk medium, and a write magnetic field is applied to the hard disk medium such that the magnitude of the write magnetic field applied to at least one magnetic grain adjacent to the rear end of the high-temperature region is 3 kOe or smaller. Thus, in the magnetic recording layer, at least one magnetic grain that is adjacent to the rear end of the high-temperature region and has a low coercivity is subjected to a relatively weak write magnetic field, whereby the direction of magnetization of the at least one magnetic grain is controlled. According to the present invention, such an operation for data writing allows high linear recording density and high signal-to-noise ratio.

According to the second thermally-assisted magnetic recording method or the second hard disk drive of the present invention, a moving spot of light is formed on the surface of the hard disk medium, and a write magnetic field is applied to the hard disk medium such that the magnitude of the write magnetic field applied to a predetermined position in the magnetic recording layer is 3 kOe or smaller. The predetermined position is determined by the center and the shape of the spot, and the effective track width. At least one magnetic grain that is present at this predetermined position has a low coercivity. In the present invention, the at least one magnetic grain having a low coercivity is subjected to a relatively weak write magnetic field, whereby the direction of magnetization of the at least one magnetic grain is controlled. According to the present invention, such an operation for data writing allows high linear recording density and high signal-to-noise ratio.

Furthermore, the hard disk medium of the present invention allows high linear recording density and high signal-to-noise ratio by employing the first or second thermally-assisted magnetic recording method of the present invention to write data thereon.

Other and further objects, features and advantages of the present invention will appear more fully from the following description.

DETAILED DESCRIPTION OF THE PREFERRED EMBODIMENTS

First Embodiment

Figure 5:
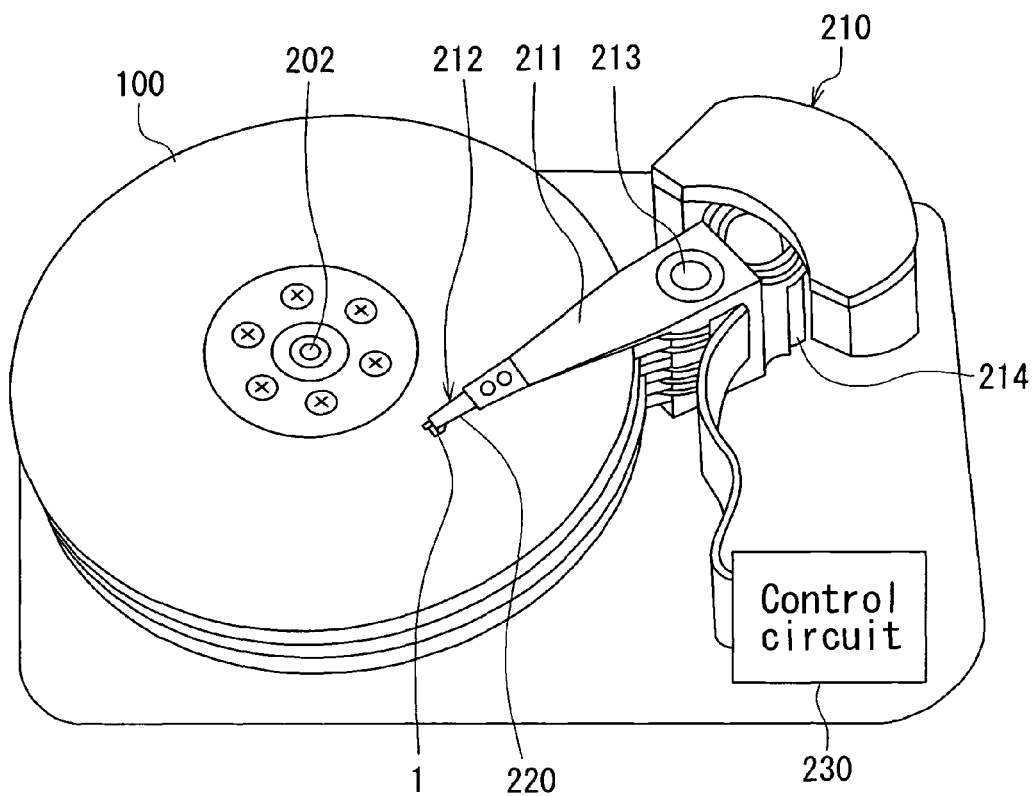
FIG. 5 is a perspective view of a hard disk drive according to the first embodiment of the invention.

Preferred embodiments of the present invention will now be described in detail with reference to the drawings. First, reference is made to FIG. 5 to describe a hard disk drive according to a first embodiment of the invention. As shown in FIG. 5, the hard disk drive includes a plurality of hard disk media 100, and a spindle motor 202 for rotating the hard disk media 100. The hard disk drive further includes an assembly carriage device 210 having a plurality of driving arms 211, and a plurality of head gimbal assemblies 212 attached to respective distal ends of the driving arms 211. Each head gimbal assembly 212 includes a magnetic head 1, and a suspension 220 that supports the magnetic head 1.

The assembly carriage device 210 is a device for positioning the magnetic heads 1 on tracks of the hard disk media 100. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The hard disk drive of the present invention is not limited to one having the above-described configuration. For example, the hard disk drive of the present invention may be configured to have a single hard disk medium 100, a single driving arm 211, a single head gimbal assembly 212 and a single magnetic head 1.

The hard disk drive further includes a control circuit 230 that controls the read/write operations of the magnetic heads 1 and also controls the light emitting operation of a laser diode serving as a light source for generating laser light for thermally-assisted magnetic recording described later.

Figure 6:
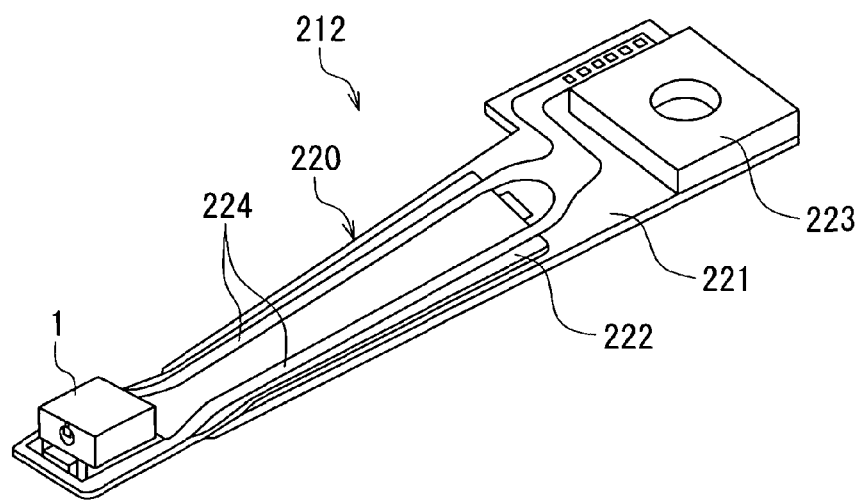
FIG. 6 is a perspective view of a head gimbal assembly of the hard disk drive shown in FIG. 5.

FIG. 6 is a perspective view showing the head gimbal assembly 212 of FIG. 5. As described above, the head gimbal assembly 212 includes the magnetic head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The magnetic head 1 is secured to the flexure 222 at the distal end of the suspension 220 such that the head 1 faces the surface of the hard disk medium 100 with a predetermined spacing (flying height). One end of the wiring member 224 is electrically connected to a plurality of terminals of the magnetic head 1. The other end of the wiring member 224 is provided with a plurality of pad-shaped terminals arranged at the base part of the load beam 221.

The head gimbal assembly is not limited to one having the configuration shown in FIG. 6. For example, the head gimbal assembly may have an IC chip for driving the head that is mounted somewhere along the suspension 220.

Figure 7:
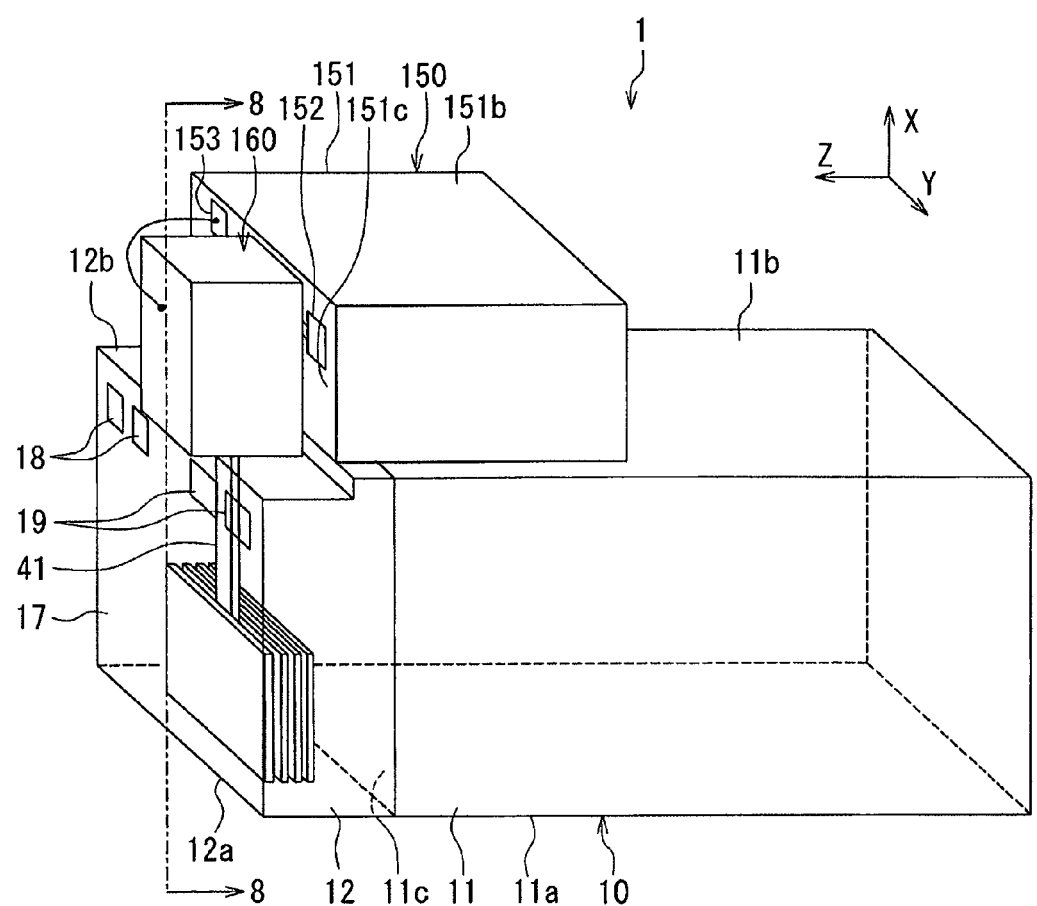
FIG. 7 is a perspective view of the magnetic head of the first embodiment of the invention.
Figure 8:
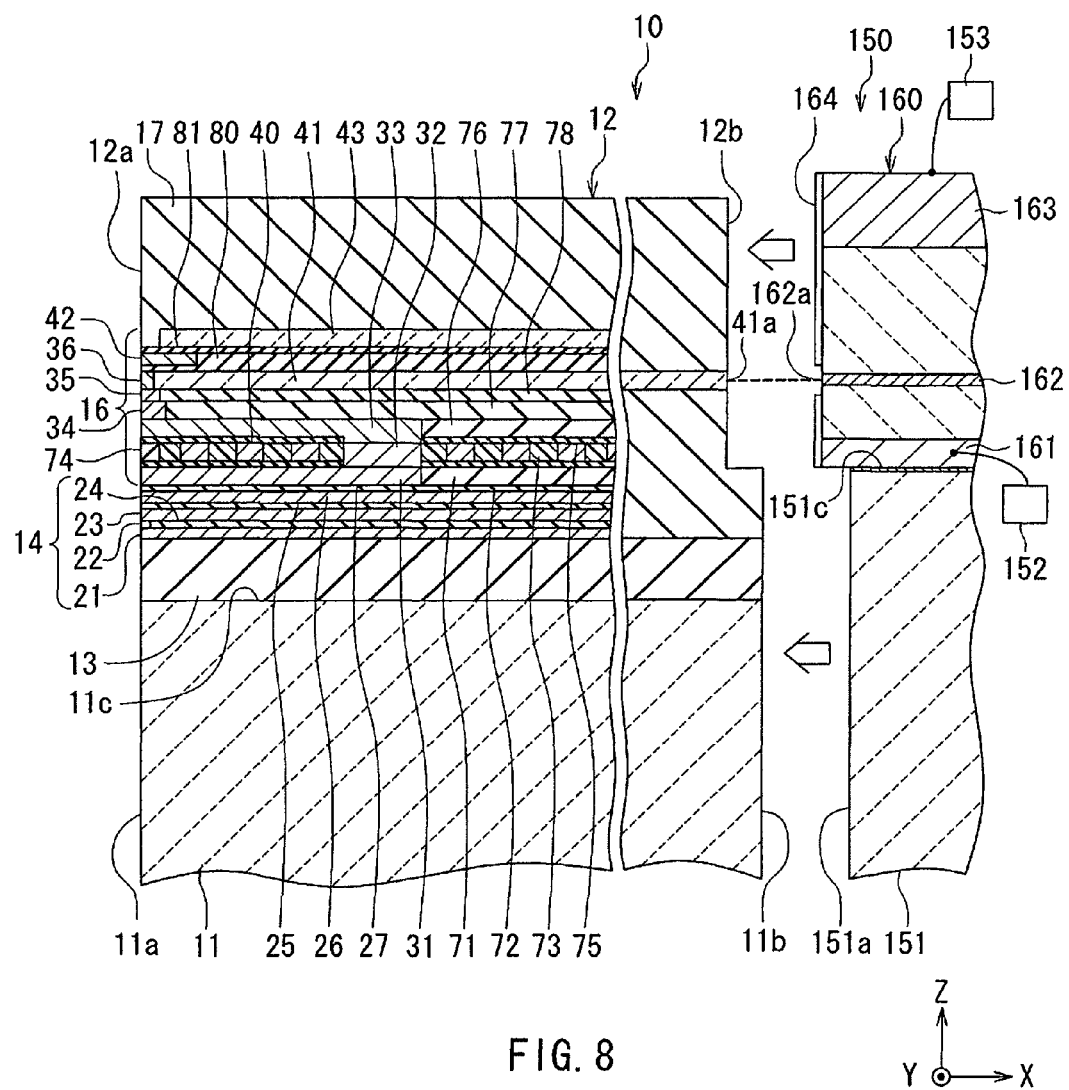
FIG. 8 shows a cross section taken along line 8-8 of FIG. 7.

The configuration of the magnetic head 1 will now be described with reference to FIG. 7 and FIG. 8. FIG. 7 is a perspective view of the magnetic head 1. FIG. 8 shows a cross section taken along line 8-8 of FIG. 7. The magnetic head 1 includes a slider 10 and a light source unit 150. FIG. 8 shows a state where the slider 10 and the light source unit 150 are separated from each other.

The slider 10 includes a slider substrate 11 and a head unit 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the hard disk medium 100, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to provide an appropriate flying height of the slider 10 from the hard disk medium 100. The head unit 12 has a medium facing surface 12a that faces the hard disk medium 100, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, -X direction, -Y direction, and -Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 8. The Z direction is a direction that extends perpendicular to the element-forming surface 11c and away from the element-forming surface 11c. The -X direction, the -Y direction, and the -Z direction are opposite to the X direction, the Y direction, and the Z direction, respectively. As viewed from the slider 10, the hard disk medium 100 moves in the Z direction. The slider 10 has an air inflow end (a leading end) at the end of the medium facing surface 11a in the -Z direction. The slider 10 has an air outflow end (a trailing end) at the end of the medium facing surface 12a in the Z direction. Track width direction TW is parallel to the Y direction.

The light source unit 150 includes a laser diode 160 serving as a light source for emitting laser light, and a support member 151 that is in the shape of a rectangular solid and supports the laser diode 160. The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c.

As shown in FIG. 8, the head unit 12 includes an insulating layer 13 disposed on the element-forming surface 11c, and also includes a read head 14, a write head 16, and a protection layer 17 that are stacked in this order on the insulating layer 13. The protection layer 17 is made of an insulating material.

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 functions to shield the MR element 22 from a magnetic field produced in the write head 16. The middle shield layer 26 is made of a soft magnetic material. The insulating layer 25 and the middle shield layer 26 may be omitted.

The write head 16 is for use in perpendicular magnetic recording. The write head 16 includes: a return yoke layer 31 disposed on the insulating layer 27; a coupling layer 32 disposed on the return yoke layer 31 at a position away from the medium facing surface 12a; and an insulating layer 71 disposed around the return yoke layer 31 on the insulating layer 27. The return yoke layer 31 and the coupling layer 32 are each made of a soft magnetic material. The top surfaces of the return yoke layer 31 and the insulating layer 71 are even with each other.

The write head 16 further includes an insulating layer 72 disposed over the return yoke layer 31 and the insulating layer 71, and a coil 40 disposed on the insulating layer 72. The coil 40 is planar spiral-shaped and wound around the coupling layer 32. The coil 40 produces a magnetic field corresponding to data to be written on the hard disk medium 100. The coil 40 is made of a conductive material such as copper.

The write head 16 further includes: an insulating layer 73 disposed around the coil 40 and the coupling layer 32 and in the space between every adjacent turns of the coil 40; an insulating layer 74 disposed around the insulating layer 73 on the insulating layer 72; and an insulating layer 75 disposed over the coil 40 and the insulating layers 73 and 74. The top surfaces of the coupling layer 32, the coil 40 and the insulating layers 73 and 74 are even with each other.

The write head 16 further includes a yoke layer 33 disposed over the coupling layer 32 and the insulating layer 75, and an insulating layer 76 disposed around the yoke layer 33 on the insulating layer 75. The yoke layer 33 is made of a soft magnetic material. The yoke layer 33 has an end face located in the medium facing surface 12a. The top surfaces of the yoke layer 33 and the insulating layer 76 are even with each other.

The write head 16 further includes a coupling layer 34 disposed on the yoke layer 33, and an insulating layer 77 disposed around the coupling layer 34 on the yoke layer 33 and the insulating layer 76. The coupling layer 34 is made of a soft magnetic material. The coupling layer 34 has an end face located in the medium facing surface 12a. The top surfaces of the coupling layer 34 and the insulating layer 77 are even with each other.

The write head 16 further includes a coupling layer 35 disposed on the coupling layer 34, and a magnetic pole 36 disposed on the coupling layer 35. The coupling layer 35 and the magnetic pole 36 are each made of a soft magnetic material. The coupling layer 35 has an end face located in the medium facing surface 12a. The magnetic pole 36 has an end face located in the medium facing surface 12a and a rear end face opposite thereto.

In the write head 16, a magnetic path for passing a magnetic flux corresponding to the magnetic field produced by the coil 40 is formed by the return yoke layer 31, the coupling layer 32, the yoke layer 33, the coupling layers 34 and 35, and the magnetic pole 36. The magnetic pole 36 allows the magnetic flux corresponding to the magnetic field produced by the coil 40 to pass, and produces a write magnetic field for writing data on the hard disk medium 100 by means of the perpendicular magnetic recording system.

The write head 16 further includes a waveguide including a core 41 and a clad. The clad includes clad layers 78, 79, and 80. The clad layer 78 is disposed around the coupling layer 35 on the coupling layer 34 and the insulating layer 77. The top surfaces of the coupling layer 35 and the clad layer 78 are even with each other. The core 41 is disposed on the coupling layer 35 and the clad layer 78. The clad layer 79 is disposed around the magnetic pole 36 and the core 41 on the coupling layer 35 and the clad layer 78. The top surfaces of the magnetic pole 36, the core 41 and the clad layer 79 are even with each other. The clad layer 80 is disposed over the magnetic pole 36, the core 41 and the clad layer 79.

The core 41 extends in the direction perpendicular to the medium facing surface 12a (the X direction). The core 41 has an incidence end 41a. The core 41 propagates laser light that is emitted from the laser diode 160 and incident on the incidence end 41a. The core 41 is made of a dielectric material that transmits the laser light. Each of the clad layers 78, 79, and 80 is made of a dielectric material and has a refractive index lower than that of the core 41.

The clad layer 80 has a groove that opens in the top surface. The write head 16 further includes a plasmon generator 42 accommodated in the groove of the clad layer 80. The plasmon generator 42 is an element that generates near-field light and applies heat to the hard disk medium 100 by using the near-field light. The plasmon generator 42 thus serves as a heating element that applies heat to the hard disk medium 100 and also as a light generating element that generates light for applying heat to the hard disk medium 100. The plasmon generator 42 is disposed above the magnetic pole 36 and the core 41 in the vicinity of the medium facing surface 12a. The plasmon generator 42 is made of a conductive material such as metal. The top surfaces of the plasmon generator 42 and the clad layer 80 are even with each other. The configurations and arrangement of the core 41, the plasmon generator 42 and the magnetic pole 36 will be described in detail later.

The write head 16 further includes an insulating layer 81 disposed over the plasmon generator 42 and the clad layer 80, and a cooling layer 43 disposed on the insulating layer 81. The cooling layer 43 is intended to absorb the heat generated by the plasmon generator 42 and thereby cool the plasmon generator 42. Part of the bottom surface of the cooling layer 43 is opposed to the top surface of the plasmon generator 42 with the insulating layer 81 interposed therebetween. The cooling layer 43 is made of a nonmagnetic material that has a high thermal conductivity, such as SiC.

As shown in FIG. 8, the protection layer 17 is disposed to cover the write head 16. As shown in FIG. 7, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 40. These terminals 18 and 19 are electrically connected to the plurality of pad-shaped terminals of the wiring member 224 shown in FIG. 6.

As shown in FIG. 8, the laser diode 160 has a multilayer structure including a lower electrode 161, an active layer 162, and an upper electrode 163. A reflecting layer 164 for totally reflecting light so as to excite oscillation is formed on two cleavage planes of the multilayer structure. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 6. When a predetermined voltage is applied to the laser diode 160 through the terminals 152 and 153, laser light is emitted from the emission center 162a of the laser diode 160. The laser light emitted from the laser diode 160 is preferably TM-mode polarized light whose electric field oscillates in a direction perpendicular to the plane of the active layer 162.

The light source unit 150 is secured to the slider 10 by bonding the bond surface 151a of the support member 151 to the rear surface 11b of the slider substrate 11, as shown in FIG. 8. The laser diode 160 and the core 41 are positioned with respect to each other so that the laser light emitted from the laser diode 160 will be incident on the incidence end 41a of the core 41.

Figure 3:
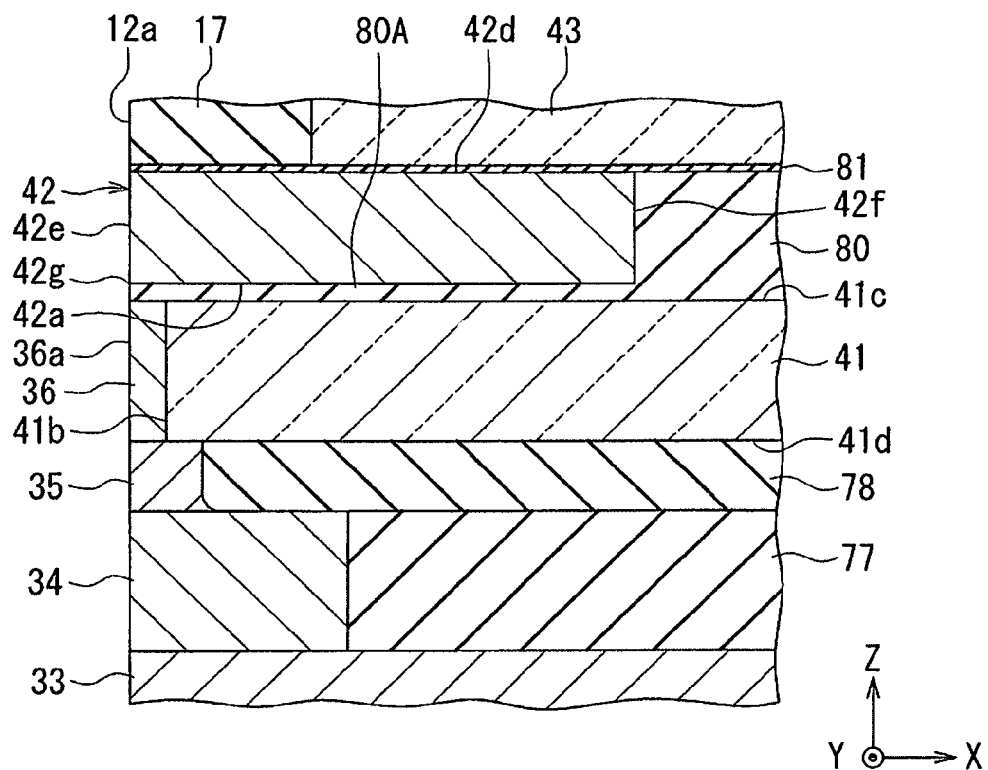
FIG. 3 is a cross-sectional view of a main part of a magnetic head of the first embodiment of the invention.
Figure 4:
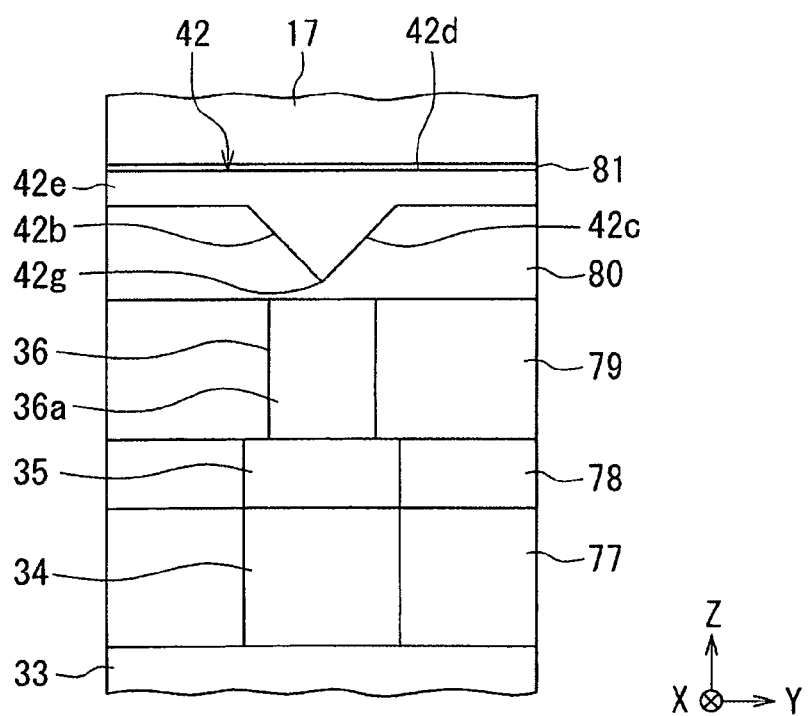
FIG. 4 is a front view of the main part of the magnetic head of the first embodiment of the invention.

Reference is now made to FIG. 3 and FIG. 4 to describe the configurations and arrangement of the core 41, the plasmon generator 42, and the magnetic pole 36. FIG. 3 is a cross-sectional view of a main part of the magnetic head 1. FIG. 4 is a front view of the main part of the magnetic head 1. As shown in FIG. 3 and FIG. 4, the magnetic pole 36 has an end face 36a located in the medium facing surface 12a. The end face 36a is rectangular in shape, for example.

In addition to the incidence end 41a shown in FIG. 8, the core 41 has a front end face 41b that is closer to the medium facing surface 12a, an evanescent light generating surface 41c or a top surface, a bottom surface 41d, and two side surfaces (not shown), as shown in FIG. 3. The evanescent light generating surface 41c generates evanescent light based on the light propagating through the core 41. The front end face 41b is in contact with the rear end face of the magnetic pole 36.

The plasmon generator 42 has an outer surface including a plurality of portions described below, and a near-field light generating edge 42g located in the medium facing surface 12a. As shown in FIG. 3, the outer surface of the plasmon generator 42 includes a propagative edge 42a. The propagative edge 42a faces the evanescent light generating surface 41c with a predetermined distance therefrom, and extends in the direction perpendicular to the medium facing surface 12a. As will be described later, the propagative edge 42a propagates plasmons. The near-field light generating edge 42g lies at an end of the propagative edge 42a.

As shown in FIG. 3, the part of the clad layer 80 interposed between the evanescent light generating surface 41c and the propagative edge 42a forms a buffer part 80A having a refractive index lower than that of the core 41.

As shown in FIG. 4, the outer surface of the plasmon generator 42 further includes a first inclined surface 42b and a second inclined surface 42c that are each connected to the propagative edge 42a and that increase in distance from each other with increasing distance from the propagative edge 42a.

As shown in FIG. 3 and FIG. 4, the outer surface of the plasmon generator 42 further includes a top surface 42d, a front end face 42e located in the medium facing surface 12a, and a rear end face 42f opposite to the front end face 42e. The front end face 42e has a tip located at an end of the propagative edge 42a. The tip constitutes the near-field light generating edge 42g.

The dimension of the plasmon generator 42 in the track width direction TW (the Y direction) at the medium facing surface 12a and the dimension of the plasmon generator 42 in the Z direction at the medium facing surface 12a are both sufficiently smaller than the wavelength of the laser light propagating through the core 41. Both of these dimensions fall within the range of 10 to 100 nm, for example. The length of the plasmon generator 42 in the X direction falls within the range of 0.6 to 4.0 µm, for example.

The length of a portion of the propagative edge 42a of the plasmon generator 42 in the X direction, the portion facing the evanescent light generating surface 41c, and the distance between the propagative edge 42a and the evanescent light generating surface 41c, are both important parameters in achieving appropriate excitation and propagation of surface plasmons. It is preferred that the above-mentioned length in the X direction fall within the range of 0.6 to 4.0 µm and be greater than the wavelength of the laser light propagating through the core 41. The above-mentioned distance preferably falls within the range of 10 to 100 nm.

Now, with reference to FIG. 3 and FIG. 4, a description will be given of the principle of generation of near-field light in the embodiment and the principle of thermally-assisted magnetic recording using the near-field light. The laser light emitted from the laser diode 160 propagates through the core 41 and reaches the vicinity of the buffer part 80A. Here, the laser light is totally reflected at the interface between the core 41 and the buffer part 80A. This generates evanescent light permeating into the buffer part 80A. Then, the evanescent light and fluctuations of charges on at least the propagative edge 42a of the outer surface of the plasmon generator 42 are coupled with each other to induce a surface plasmon polariton mode. In this way, surface plasmons are excited at least on the propagative edge 42a through coupling with the evanescent light generated from the evanescent light generating surface 41c.

The surface plasmons excited at least on the propagative edge 42a of the outer surface of the plasmon generator 42 are transformed into edge plasmons to propagate along the propagative edge 42a to the near-field light generating edge 42g. Consequently, the edge plasmons concentrate at the near-field light generating edge 42g, and near-field light occurs from the near-field light generating edge 42g based on the edge plasmons. The near-field light is projected toward the hard disk medium 100, reaches the surface of the hard disk medium 100 and heats a part of the magnetic recording layer of the hard disk medium 100. This lowers the coercivity of the part of the magnetic recording layer. In thermally-assisted magnetic recording, the part of the magnetic recording layer with the lowered coercivity is subjected to the write magnetic field produced by the magnetic pole 36 for data writing.

Figure 9:
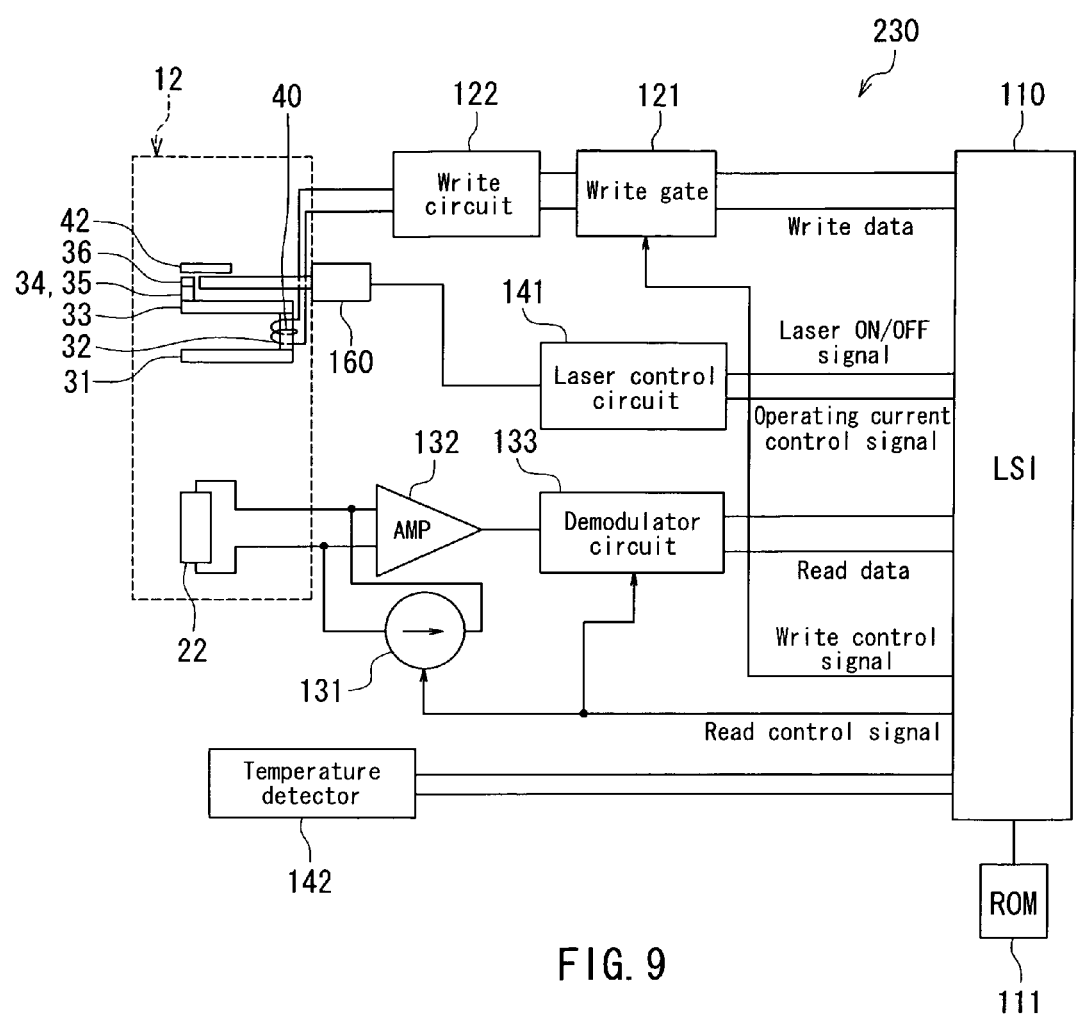
FIG. 9 is a block diagram showing the circuit configuration of the hard disk drive according to the first embodiment of the invention.

Reference is now made to FIG. 9 to describe the circuit configuration of the control circuit 230 shown in FIG. 5 and the operation of the magnetic head 1. The control circuit 230 includes a control LSI (large scale integrated circuit) 110, a ROM (read only memory) 111 connected to the control LSI 110, a write gate 121 connected to the control LSI 110, and a write circuit 122 connected to the write gate 121 and the coil 40.

The control circuit 230 further includes a constant current circuit 131 connected to the MR element 22 and the control LSI 110, an amplifier 132 connected to the MR element 22, and a demodulator circuit 133 connected to an output of the amplifier 132 and the control LSI 110. The control circuit 230 further includes a laser control circuit 141 connected to the laser diode 160 and the control LSI 110, and a temperature detector 142 connected to the control LSI 110.

The control LSI 110 supplies write data and a write control signal to the write gate 121. The control LSI 110 supplies a read control signal to the constant current circuit 131 and the demodulator circuit 133, and receives read data output from the demodulator circuit 133. The control LSI 110 supplies a laser ON/OFF signal and an operating current control signal to the laser control circuit 141. The temperature detector 142 detects the temperature of the magnetic recording layer of the hard disk medium 100, and supplies this temperature information to the control LSI 110. The ROM 111 contains a control table and the like for controlling the value of the operating current to be supplied to the laser diode 160.

In a write operation, the control LSI 110 supplies write data to the write gate 121. The write gate 121 supplies the write data to the write circuit 122 only when the write control signal indicates a write operation. According to the write data, the write circuit 122 passes a write current through the coil 40. Consequently, the magnetic pole 36 produces a write magnetic field and data is written on the magnetic recording layer of the hard disk medium 100 through the use of the write magnetic field.

In a read operation, the constant current circuit 131 supplies a certain sense current to the MR element 22 only when the read control signal indicates a read operation. The output voltage of the MR element 22 is amplified by the amplifier 132 and input to the demodulator circuit 133. When the read control signal indicates a read operation, the demodulator circuit 133 demodulates the output of the amplifier 132 to generate read data, and supplies the read data to the control LSI 110.

The laser control circuit 141 controls the supply of the operating current to the laser diode 160 on the basis of the laser ON/OFF signal, and also controls the value of the operating current to be supplied to the laser diode 160 on the basis of the operating current control signal. When the laser ON/OFF signal indicates an ON operation, the laser control circuit 141 exercises control so that an operating current at or above an oscillation threshold is supplied to the laser diode 160. Consequently, the laser diode 160 emits laser light, and the laser light propagates through the core 41. Then, according to the principle of generation of near-field light described previously, near-field light occurs from the near-field light generating edge 42g of the plasmon generator 42. The near-field light heats a part of the magnetic recording layer of the hard disk medium 100, thereby lowering the coercivity of that part. When writing, the part of the magnetic recording layer with the lowered coercivity is subjected to the write magnetic field produced by the magnetic pole 36 for data writing.

On the basis of such factors as the temperature of the magnetic recording layer of the hard disk medium 100 measured by the temperature detector 142, the control LSI 110 consults the control table stored in the ROM 111 to determine the value of the operating current of the laser diode 160. Using the operating current control signal, the control LSI 110 controls the laser control circuit 141 so that the operating current of that value is supplied to the laser diode 160. The control table contains, for example, data that indicates the oscillation threshold and the temperature dependence of the light output versus operating current characteristic of the laser diode 160. The control table may further contain data that indicates the relationship between the operating current value and a temperature increase of the magnetic recording layer heated by the near-field light, and data that indicates the temperature dependence of the coercivity of the magnetic recording layer. It should be noted that the circuit configuration of the control circuit 230 is not limited to one shown in FIG. 9.

Figure 10:
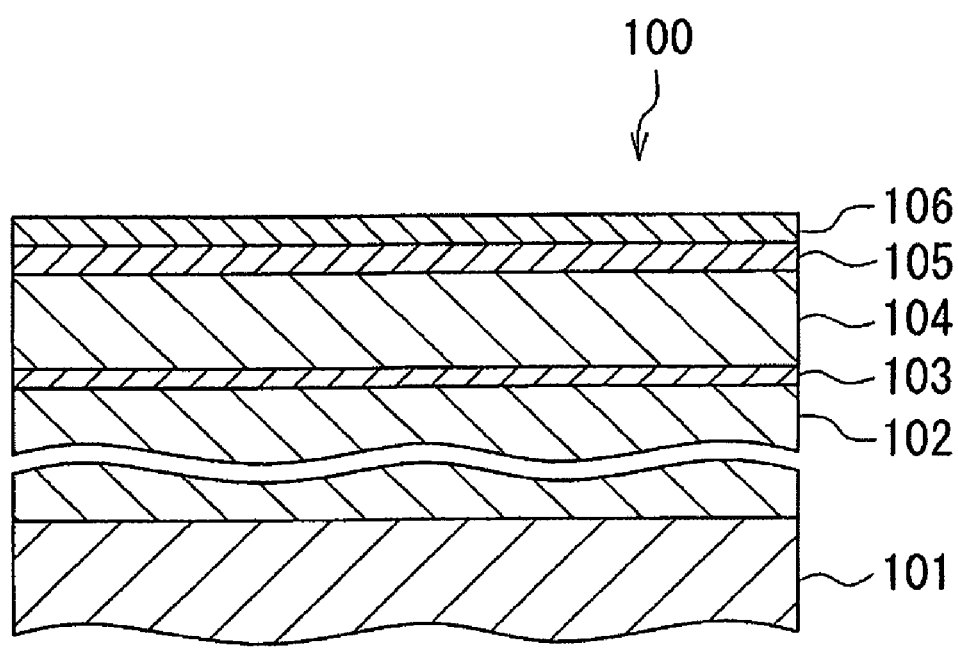
FIG. 10 is a cross-sectional view of a hard disk medium of the first embodiment of the invention.

Reference is now made to FIG. 10 to describe the configuration of the hard disk medium 100. The hard disk medium 100 includes a substrate 101, and a soft magnetic layer 102, an orientation layer 103, a magnetic recording layer 104, a cap layer 105, and a protection layer 106 that are stacked in this order on the substrate 101.

The substrate 101 is made of a nonmagnetic material. The nonmagnetic material to form the substrate 101 may be a metallic material such as aluminum or a non-metallic material such as glass. The soft magnetic layer 102 is made of a soft magnetic material. The soft magnetic layer 102 functions to pass a write magnetic field supplied from the magnetic head 1 to the hard disk medium 100 and to allow the write magnetic field to flow back to the magnetic head 1. The orientation layer 103 is intended to improve the orientability of the magnetic recording layer 104 to be formed thereon.

The magnetic recording layer 104 has what is called a granular structure. That is, the magnetic recording layer 104 contains a plurality of magnetic grains, each being made up of crystal grains of a ferromagnetic material, and a grain boundary portion that is made of a nonmagnetic material and separates the'plurality of magnetic grains from each other. The magnetic grains are 4 to 12 nm in diameter, for example. The magnetic grains have an easy axis of magnetization oriented in the direction of thickness of the magnetic recording layer 104.

The cap layer 105 is made of a ferromagnetic material. The cap layer 105 has a coercivity vanishing temperature higher than the maximum value of the coercivity vanishing temperatures of the plurality of magnetic grains of the magnetic recording layer 104. The cap layer 105 is preferably a continuous film.

The protection layer 106 is made of a nonmagnetic material. The protection layer 106 functions to protect the cap layer 105 and the magnetic recording layer 104 and to prevent damage to the surface of the hard disk medium 100.

Figure 1:
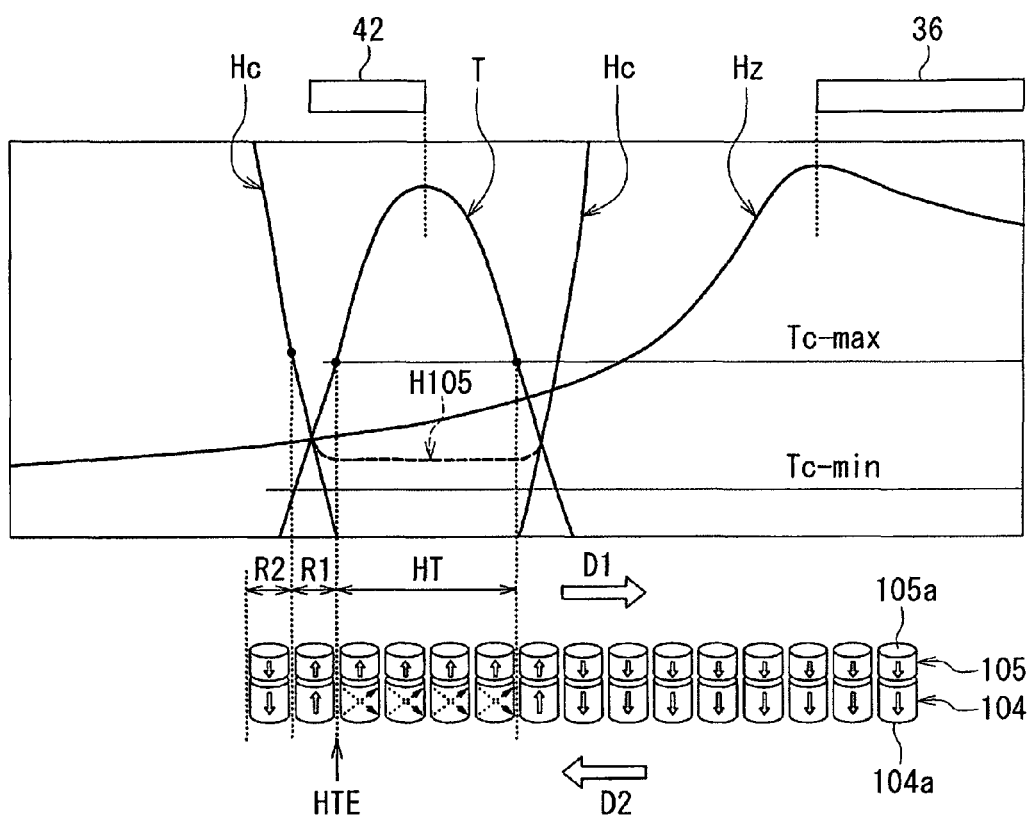
FIG. 1 is an explanatory diagram illustrating the principle of a thermally-assisted magnetic recording method according to a first embodiment of the invention.

Reference is now made to FIG. 1 to describe a thermally-assisted magnetic recording method (hereinafter simply referred to as recording method) according to the present embodiment and the write operation of the hard disk drive according to the present embodiment which employs this recording method. In the descriptions below, the plasmon generator 42 will be referred to as the heating element 42. In FIG. 1, symbol 104a denotes the magnetic grains of the magnetic recording layer 104. Symbol 105a denotes portions of the cap layer 105 that correspond to the respective magnetic grains 104a (hereinafter referred to as magnetic grain corresponding portions). FIG. 1 shows a plurality of magnetic grains 104a arrayed in a line in the track direction (the horizontal direction in FIG. 1) and a plurality of magnetic grain corresponding portions 105a located on the respective plurality of magnetic grains 104a. In FIG. 1, the hollow arrows in the magnetic grains 104a or the magnetic grain corresponding portions 105a indicate the direction of magnetization of the magnetic grains 104a or the magnetic grain corresponding portions 105a. Furthermore, the two intersecting broken-line arrows show that magnetization has disappeared.

FIG. 1 shows the magnetic pole 36 and the heating element 42 of the magnetic head 1. The graph in FIG. 1 shows the relationship between the position in the track direction and the temperature T, the write field magnitude Hz, and the coercivity Hc in the magnetic recording layer 104. In this graph, the horizontal axis represents the position in the track direction. The vertical axis in this graph represents the temperature T, the magnitude Hz of the write magnetic field, and the coercivity Hc, where their values increase in the upward direction. In the present embodiment, the temperature T takes on the maximum value at the position corresponding to the near-field light generating edge 42g which is an end of the heating element 42 on the leading end side (the right-hand side in FIG. 1). On the other hand, the magnitude Hz of the write magnetic field takes on the maximum value at the position corresponding to an end of the magnetic pole 36 on the trailing end side (the left-hand side in FIG. 1).

The plurality of magnetic grains 104a of the magnetic recording layer 104 have a coercivity vanishing temperature distribution. Hereinafter, the maximum value and the minimum value in the coercivity vanishing temperature distribution of the plurality of magnetic grains 104a are denoted with symbols Tc-max and Tc-min, respectively. FIG. 1 shows the levels of Tc-max and Tc-min.

According to the recording method of the present embodiment, the magnetic head 1 moves relative to the hard disk medium 100, and the magnetic head 1 applies a write magnetic field and heat to the hard disk medium 100 to write data thereon by thermally-assisted magnetic recording. The recording method according to the present embodiment includes a first step and a second step. The first step applies heat to part of the hard disk medium 100 using the heating element 42 and moves the heat-receiving site in the hard disk medium 100, thereby forming a moving high-temperature region HT in the magnetic recording layer 104. In FIG. 1, symbol D1 denotes the direction of movement of the high-temperature region HT. The direction D1 is also the direction of the movement of the magnetic head 1 relative to the hard disk medium 100. In FIG. 1, symbol D2 denotes the direction of movement of the hard disk medium 100 relative to the magnetic head 1. The direction D2 is opposite to the direction D1. The present embodiment is configured so that relative to the heating element 42, the magnetic pole 36 is disposed forward along the direction D1 of movement of the high-temperature region HT (i.e., disposed on the leading end side).

The high-temperature region HT is higher in temperature than regions therearound and has a temperature equal to or higher than the maximum value Tc-max of the coercivity vanishing temperatures of the plurality of magnetic grains 104a of the magnetic recording layer 104. At least one magnetic grain 104a that is adjacent to the rear end HTE of the high-temperature region HT in the direction D1 of movement of the high-temperature region HT has a coercivity of a value other than 0.

In the cap layer 105, as in the high-temperature region HT, there is also formed a region higher in temperature than regions therearound. The highest temperature in this region does not exceed the coercivity vanishing temperature of the cap layer 105.

Here, in the magnetic recording layer 104, a region that is adjacent to the rear end HTE of the high-temperature region HT and has a length of one pitch of the array of the plurality of magnetic grains 104a in the track direction is defined as a first adjacent region R1. Also, a region that is adjacent to the first adjacent region R1 at a backward position in the direction D1 of movement of the high-temperature region HT and has a length of one pitch of the array of the plurality of magnetic grains 104a in the track direction is defined as a second adjacent region R2. Because the high-temperature region HT moves, one magnetic grain 104a located within the high-temperature region HT at a certain time goes out of the high-temperature region HT as time elapses, and passes through the first adjacent region R1 and the second adjacent region R2 in this order.

As shown in FIG. 1, the temperature T of the magnetic recording layer 104 decreases with increasing backward distance from the rear end HTE of high-temperature region HT in the direction D1 of movement. Accordingly, the coercivity Hc of the magnetic recording layer 104 increases with increasing backward distance from the rear end HTE of high-temperature region HT in the direction D1 of movement. As described above, the plurality of magnetic grains 104a of the magnetic recording layer 104 have a coercivity vanishing temperature distribution. This in turn causes the plurality of magnetic grains 104a to have a coercivity distribution at a certain same temperature.

The temperature T at the boundary position between the first adjacent region R1 and the second adjacent region R2 is lower than the minimum value Tc-min of the coercivity vanishing temperatures of the plurality of magnetic grains 104a. The magnetic grains 104a within the first adjacent region R1 therefore have a coercivity of a value other than 0.

The second step applies a write magnetic field to the hard disk medium 100 using the magnetic pole 36 such that the magnitude Hz of the write magnetic field applied to at least one magnetic grain 104a that is adjacent to the rear end HTE of the high-temperature region HT, that is, at least one magnetic grain 104a within the first adjacent region R1, is 3 kOe or smaller. At any position in the first adjacent region R1, the write magnetic field has generally the same magnitude Hz. In the present embodiment, the magnetic pole 36 is disposed forward of the heating element 42 along the direction D1 of movement of the high-temperature region HT. Accordingly, the magnitude Hz of the write magnetic field at any position in the first adjacent region R1 is equal to or less than the magnitude Hz of the write magnetic field at the rear end HTE. Therefore, in the present embodiment, if the magnitude Hz of the write magnetic field at the rear end HTE is 3 kOe or smaller, then the magnitude Hz of the write magnetic field applied to at least one magnetic grain 104a adjacent to the rear end HTE is 3 kOe or smaller. The magnitude Hz of the write magnetic field applied to at least one magnetic grain 104a adjacent to the rear end HTE is preferably 0.5 kOe or smaller. Furthermore, in the present embodiment, the magnitude Hz of the write magnetic field within the second adjacent region R2 does not exceed the coercivity of the magnetic grains 104a within the second adjacent region R2.

The first and second steps are simultaneously executed while the magnetic head 1 is moving relative to the hard disk medium 10.

Note that the direction of the write magnetic field is switched between the upward direction of FIG. 1 and the downward direction of FIG. 1 depending on data to be written. The magnitude of the write magnetic field mentioned above refers to the absolute value of the write magnetic field that does not depend on the direction of the write magnetic field.

As used herein, the magnitude Hz of the write magnetic field in the magnetic recording layer 104 is defined as the magnitude of the write magnetic field at the center of the magnetic recording layer 104 in the direction of its thickness. On the other hand, the magnitude of the write magnetic field in the cap layer 105 is defined as the magnitude of the write magnetic field at the center of the cap layer 105 in the direction of its thickness.

According to the recording method of the present embodiment, as described above, the moving high-temperature region HT is formed in the magnetic recording layer 104, and a write magnetic field is applied to the hard disk medium 100 such that the magnitude Hz of the write magnetic field applied to at least one magnetic grain 104a that is adjacent to the rear end HTE of the high-temperature region HT is 3 kOe or smaller. The temperature of each magnetic grain 104a within the high-temperature region HT is equal to or higher than the coercivity vanishing temperature of the magnetic grain 104a. Therefore, the magnetic grains 104a within the high-temperature region HT have no coercivity. On the other hand, the magnetic grains 104a have a low coercivity close to 0 Oe when passing through the first adjacent region R1. In at least part of the first adjacent region R1, the magnitude Hz of the write magnetic field exceeds the coercivity of the magnetic grains 104a that pass through the first adjacent region R1. Therefore, when the magnetic grains 104a pass through the first adjacent region R1, the magnetization of the magnetic grains 104a is oriented in the direction of the write magnetic field.

On the other hand, the magnitude Hz of the write magnetic field in the second adjacent region R2 does not exceed the coercivity of the magnetic grains 104a within the second adjacent region R2. Therefore, the direction of magnetization of the magnetic grains 104a within the second adjacent region R2 does not vary according to the direction of the write magnetic field.

As described previously, a magnetic grain 104a located within the high-temperature region HT at a certain time goes out of the high-temperature region HT as time elapses, and passes through the first adjacent region R1 and the second adjacent region R2 in this order. The direction of magnetization of the magnetic grain 104a is oriented in the direction of the write magnetic field when the magnetic grain 104a passes through the first adjacent region R1, and is already fixed at the point in time when the magnetic grain 104a enters into the second adjacent region R2. In this manner, the difference in the direction of magnetization serves to write data on the magnetic recording layer 104. The write operation will be described in greater detail later.

Figure 2:
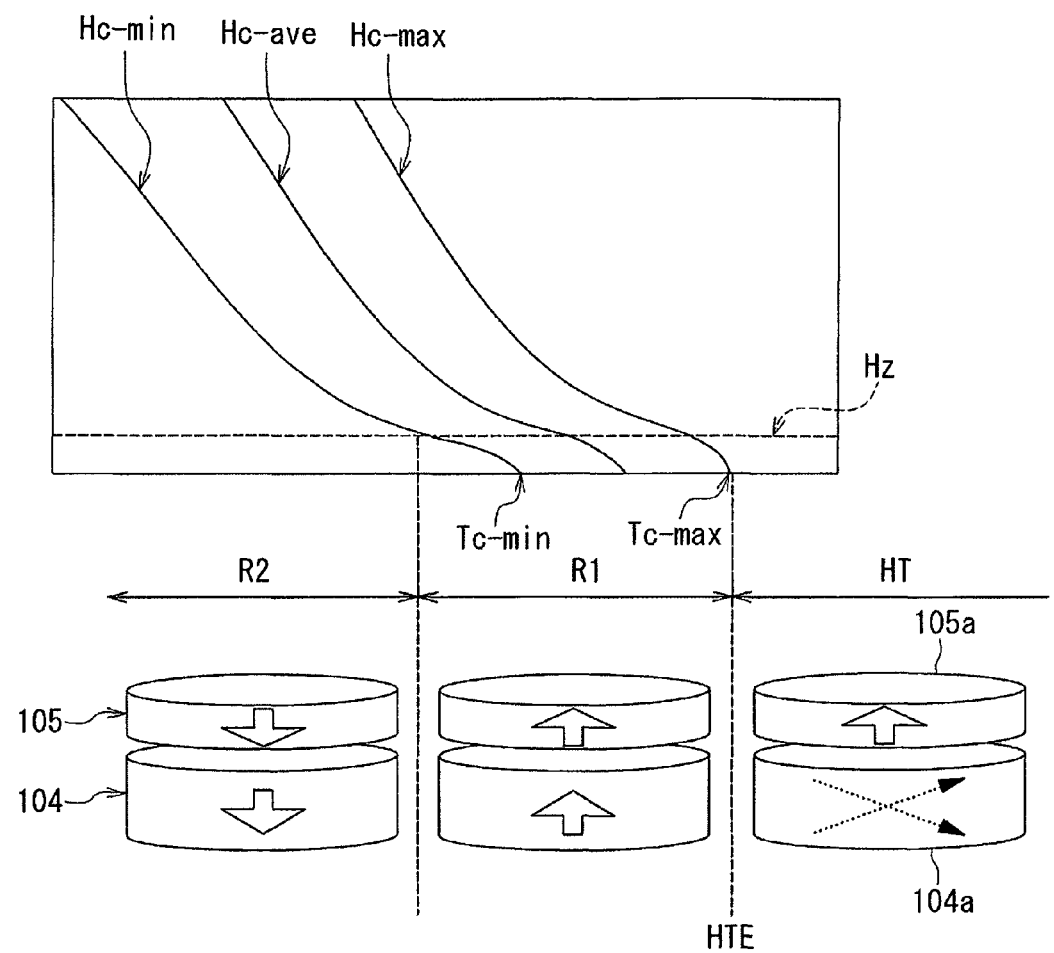
FIG. 2 is an explanatory diagram illustrating the relationship between the write operation of the first embodiment of the invention and the change in coercivity of a plurality of magnetic grains of a magnetic recording layer.

Reference is now made to FIG. 2 to describe the relationship between the write operation of the present embodiment and the change in coercivity of the plurality of magnetic grains 104a of the magnetic recording layer 104. FIG. 2 shows one magnetic grain 104a within the first adjacent region R1, two magnetic grains 104a adjacent to that magnetic grain 104a at forward and backward positions in the track direction, and three magnetic grain corresponding portions 105a of the cap layer 105 that correspond to those magnetic grains 104a. The graph in FIG. 2 shows the relationship between the temperature and position in the track direction of the magnetic recording layer 104 and the coercivity of the magnetic grains 104a. In this graph, the horizontal axis represents the temperature and position in the track direction of the magnetic recording layer 104. On the horizontal axis, the temperature of the magnetic recording layer 104 increases toward the right. The vertical axis represents the coercivity, where its value increases in the upward direction. This graph also shows the level of the magnitude Hz of the write magnetic field in the magnetic recording layer 104. Since the magnitude Hz of the write magnetic field does not greatly vary according to the position within the positional range shown in FIG. 2, the magnitude Hz of the write magnetic field is expressed as a constant value in FIG. 2.

Here, the coercivity of a magnetic grain 104a that has the maximum coercivity vanishing temperature Tc-max in the coercivity vanishing temperature distribution of the plurality of magnetic grains 104a is denoted with symbol Hc-max. On the other hand, the coercivity of a magnetic grain 104a that has the minimum coercivity vanishing temperature Tc-min in the aforementioned distribution is denoted with symbol Hc-min. Furthermore, the coercivity of a magnetic grain 104a that has a median coercivity vanishing temperature in the aforementioned distribution is denoted with symbol Hc-ave. The graph of FIG. 2 shows the Hc-max, Hc-min, and Hc-ave. Hc-max is also the maximum value in the coercivity distribution of the plurality of magnetic grains 104a. Hc-min is also the minimum value in the coercivity distribution of the plurality of magnetic grains 104a.

The temperature at the rear end HTE of the high-temperature region HT is equal to or higher than Tc-max. The temperature at the boundary position between the first adjacent region R1 and the second adjacent region R2 is lower than Tc-min. Therefore, even though the plurality of magnetic grains 104a have a coercivity vanishing temperature distribution, one magnetic grain 104a can have a coercivity of a value other than 0 while passing through the first adjacent region R1. As such, when a magnetic grain 104a passes through the first adjacent region R1, the direction of magnetization of the magnetic grain 104a is oriented in the direction of the write magnetic field.

Furthermore, the magnitude Hz of the write magnetic field at the boundary position between the first adjacent region R1 and the second adjacent region R2 does not exceed Hc-min at that position. Therefore, even though the plurality of magnetic grains 104a have a coercivity vanishing temperature distribution and a coercivity distribution, the direction of magnetization of a magnetic grain 104a is already fixed at the point in time when the magnetic grain 104a enters into the second adjacent region R2.

As described above, the recording method according to the present embodiment is executed through the following first and second steps. The first step forms the moving high-temperature region HT in the magnetic recording layer 104 of the hard disk medium 100. The second step applies a write magnetic field to the hard disk medium 100 such that the magnitude Hz of the write magnetic field applied to at least one magnetic grain 104a that is adjacent to the rear end HTE of the high-temperature region HT is 3 kOe or smaller. Thus, in the first adjacent region R1 of the magnetic recording layer 104, at least one magnetic grain 104a that is adjacent to the rear end HTE of the high-temperature region HT and has a low coercivity is subjected to a relatively weak write magnetic field, whereby the direction of magnetization of the at least one magnetic grain 104a is controlled. According to the present embodiment, such an operation for data writing allows high linear recording density and high signal-to-noise ratio. This advantageous effect will be described in more detail later with reference to simulation results.

In the present embodiment, in particular, the heating element 42 is a light generating element that generates light for applying heat to the hard disk medium 100. In the first step, the hard disk medium 100 is irradiated with light by using the light generating element (the heating element 42) in order to apply heat to part of the hard disk medium 100, whereby a moving spot of the light is formed on the surface of the hard disk medium 100. This moving spot serves to form the moving high-temperature region HT in the magnetic recording layer 104. The spot moves in the same direction as the high-temperature region HT does, i.e., in the direction D1.

The second step applies a write magnetic field to the hard disk medium 100 such that the magnitude Hz of the write magnetic field applied to a predetermined position in the magnetic recording layer 104 is 3 kOe or smaller. The predetermined position is the position of at least one magnetic grain 104a that is adjacent to the rear end HTE of the high-temperature region HT. This predetermined position is determined by the center and the shape of the spot and the effective track width. This will be discussed later in more detail. The at least one magnetic grain 104a that is present at this predetermined position has a coercivity of a small value, as described above. In the present embodiment, the at least one magnetic grain 104a having a low coercivity is subjected to a relatively weak write magnetic field, whereby the direction of magnetization of the at least one magnetic grain 104a is controlled.

The cap layer 105 will now be described in detail with reference to FIG. 1. The cap layer 105 has a coercivity vanishing temperature higher than Tc-max. The highest temperature within the high-temperature region HT does not exceed the coercivity vanishing temperature of the cap layer 105. Therefore, the cap layer 105 has a coercivity of a value other than 0 even in a region corresponding to the high-temperature region HT. In FIG. 1, the broken line denoted by symbol H105 represents the coercivity of the cap layer 105 in the vicinity of the region corresponding to the high-temperature region HT.

In at least a part of the cap layer 105, the coercivity of the cap layer 105 is higher than the coercivity of the magnetic recording layer 104. This part lies in the range from the position corresponding to the rear end HTE of the high-temperature region HT to the position corresponding to the boundary between the first adjacent region R1 and the second adjacent region R2. On the other hand, the coercivity of the cap layer 105 at room temperatures (25° C.) is lower than the coercivity of the magnetic recording layer 104. For example, the coercivity of the cap layer 105 at room temperatures (25° C.) falls within the range of 0.3 to 2 kOe.

At the position corresponding to the rear end HTE of the high-temperature region HT, the magnitude of the write magnetic field applied to the cap layer 105 is equal to or greater than the coercivity of the cap layer 105. Therefore, the direction of magnetization of a magnetic grain corresponding portion 105a of the cap layer 105 that corresponds to a magnetic grain 104a in the first adjacent region R1 is the same as the direction of the write magnetic field applied to the magnetic grain corresponding portion 105a.

Providing such a cap layer 105 allows enhancing the stability of the write operation described above and improving the signal-to-noise ratio. This is because of the following reasons. In the present embodiment, as described above, a relatively weak write magnetic field is applied to a magnetic grain 104a having a low coercivity in the first adjacent region R1 so as to control the direction of magnetization of the magnetic grain 104a. The presence of the cap layer 105 means the presence of a magnetic grain corresponding portion 105a, which has a coercivity higher than the low coercivity of the magnetic grain 104a, at the position corresponding to that magnetic grain 104a. The direction of magnetization of this magnetic grain corresponding portion 105a is aligned with the direction of magnetization to be set for the magnetic grain 104a in the first adjacent region R1, and is stable when compared with the magnetization of the magnetic grains 104a. This makes it possible to set the direction of magnetization of the magnetic grains 104a with stability even when the magnetic grains 104a have a low coercivity.

Figure 11:
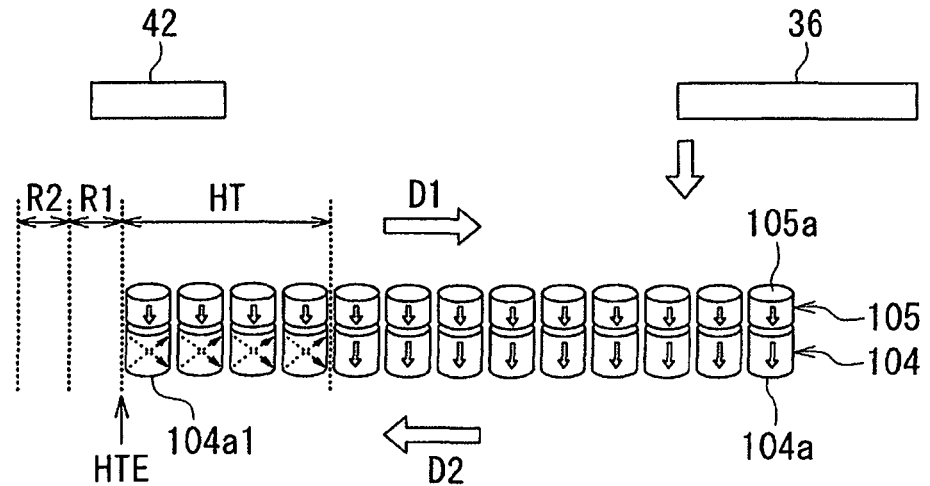
FIG. 11 is an explanatory diagram showing a step of the write operation of the first embodiment of the invention.

The write operation of the present embodiment will now be described in more detail with reference to FIG. 11 and FIG. 12. FIG. 11 is an explanatory diagram showing a step of the write operation. FIG. 11 shows the magnetic pole 36, the heating element 42, the magnetic recording layer 104 and the cap layer 105 at a certain time. Assume that the write magnetic field at this time is oriented in the downward direction. In FIG. 11, attention is focused on a magnetic grain 104a that is the closest to the rear end HTE of the high-temperature region HT among a plurality of magnetic grains 104a located in the high-temperature region HT. Now, this magnetic grain is denoted with symbol 104a1. The magnetic grain 104a1 is located within the high-temperature region HT and thus has lost its coercivity.

Figure 12:
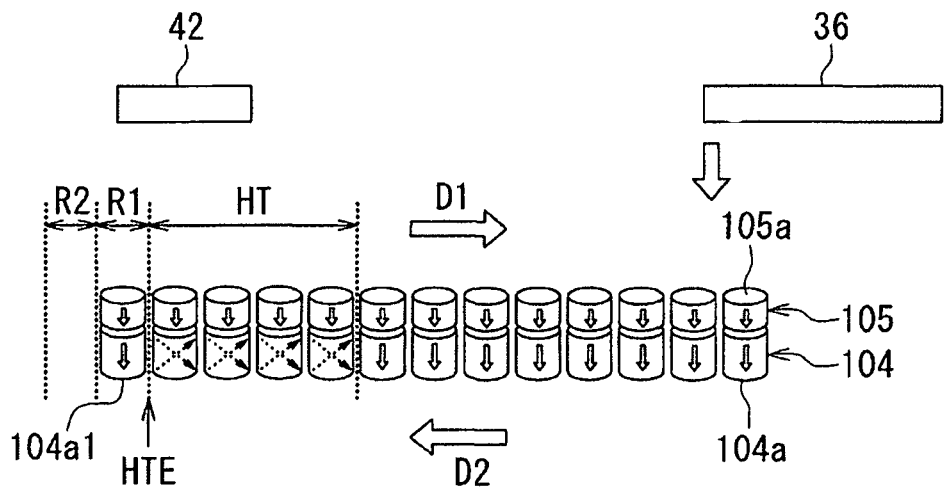
FIG. 12 is an explanatory diagram showing a step that follows the step shown in FIG. 11.

FIG. 12 is an explanatory diagram showing a step that follows the step shown in FIG. 11. The magnetic grain 104a1 goes out of the high-temperature region HT as time elapses, and then enters into the first adjacent region R1 as shown in FIG. 12. Assume that the write magnetic field at this time is also oriented in the downward direction. When passing through the first adjacent region R1, the magnetic grain 104a1 has a coercivity of a value other than 0, and the magnetic grain 104a1 has a magnetization in the direction of the write magnetic field, i.e., in the downward direction.

Figure 13:
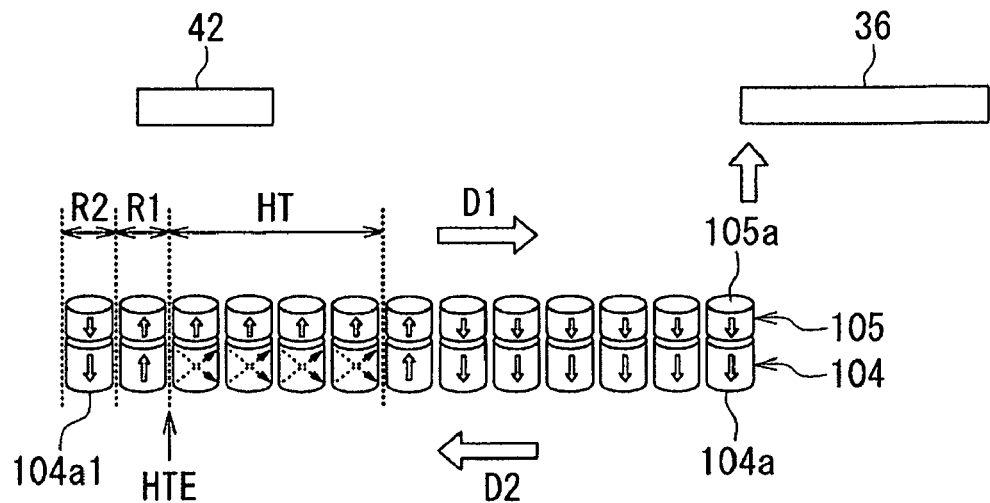
FIG. 13 is an explanatory diagram showing a step that follows the step shown in FIG. 12.

FIG. 13 is an explanatory diagram showing a step that follows the step shown in FIG. 12. As time further elapses, the magnetic grain 104a1 enters into the second adjacent region R2 as shown in FIG. 13. Assume that the write magnetic field at this time is oriented in the upward direction. At the point in time when the magnetic grain 104a1 enters into the second adjacent region R2, the direction of magnetization of the magnetic grain 104a1 is already fixed in the downward direction. On the other hand, a magnetic grain 104a that is in the first adjacent region R1 and adjacent to the magnetic grain 104a1 has a magnetization in the direction of the write magnetic field, i.e., in the upward direction.

Figure 14:
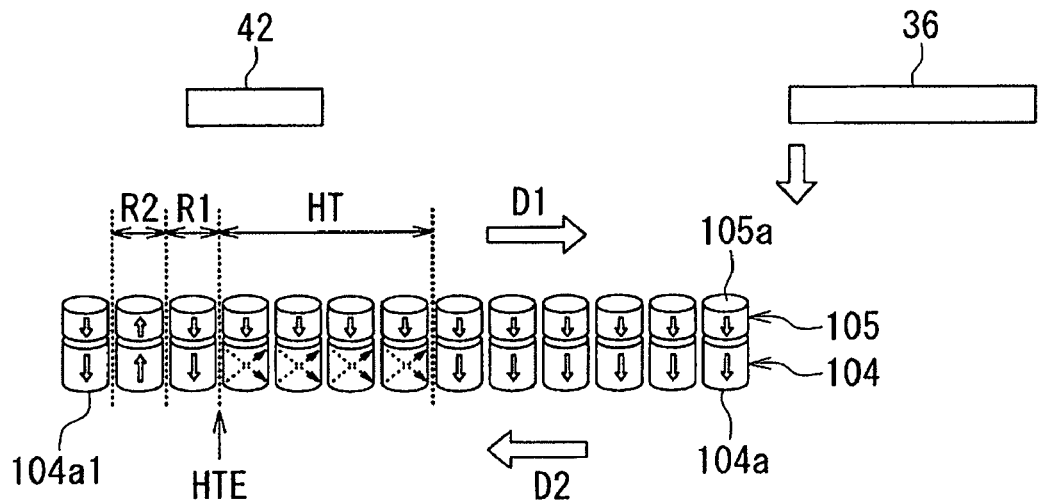
FIG. 14 is an explanatory diagram showing a step that follows the step shown in FIG. 13.

FIG. 14 is an explanatory diagram showing a step that follows the step shown in FIG. 13. As time further elapses, the magnetic grain 104a1 goes out of the second adjacent region R2 as shown in FIG. 14. Assume that the write magnetic field at this time is oriented in the downward direction. The direction of magnetization of the magnetic grain 104a1 is kept fixed in the downward direction. On the other hand, at the point in time when the magnetic grain 104a adjacent to the magnetic grain 104a1 enters into the second adjacent region R2, the magnetic grain 104a has a magnetization already fixed in the upward direction. Another magnetic grain 104a subsequently having entered into the first adjacent region R1 has a magnetization in the direction of the write magnetic field, i.e., in the downward direction. In the present embodiment, the above-described operations are repeated to perform writing.

Figure 15:
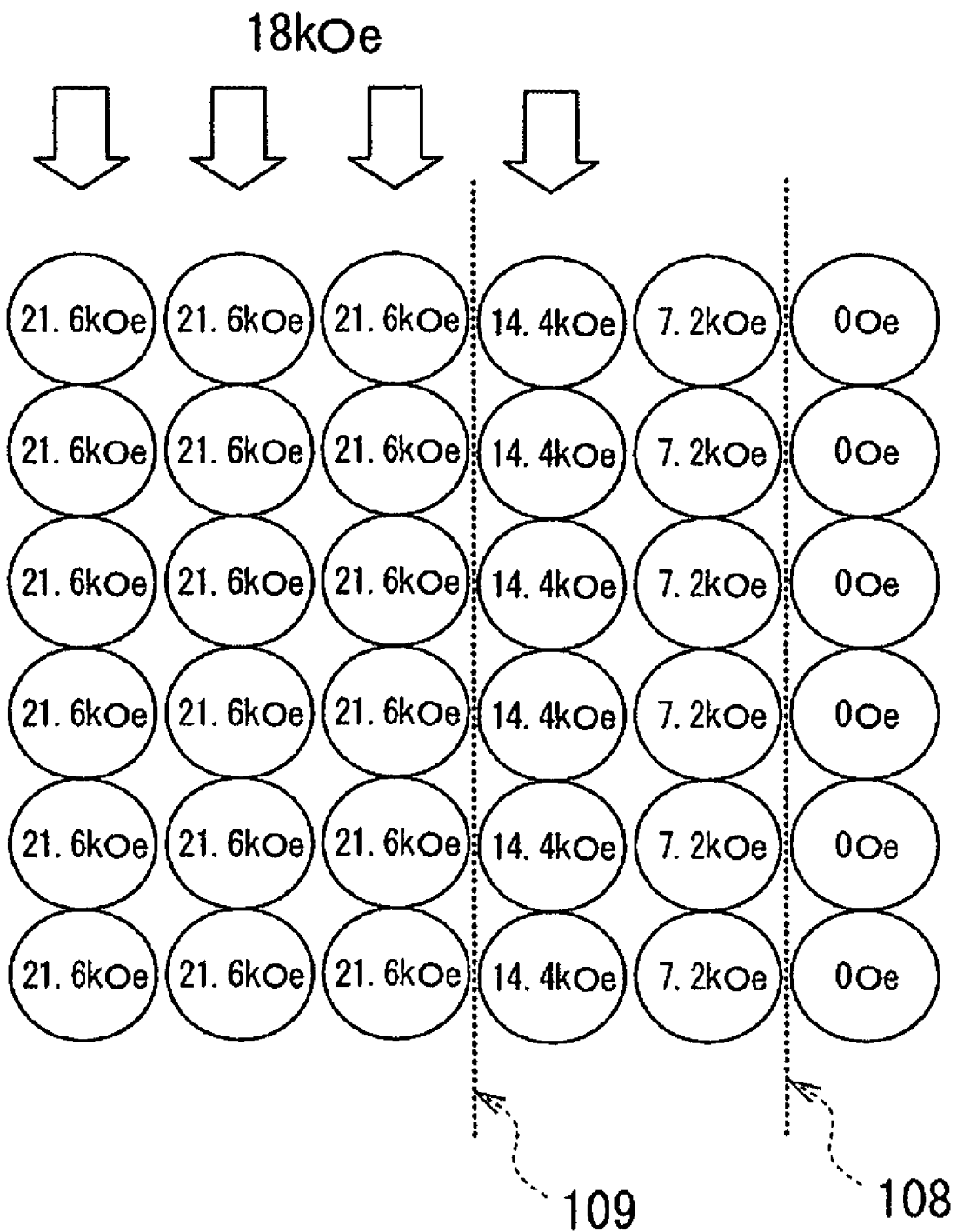
FIG. 15 is an explanatory diagram illustrating the principle of a recording method of a comparative example.
Figure 16:
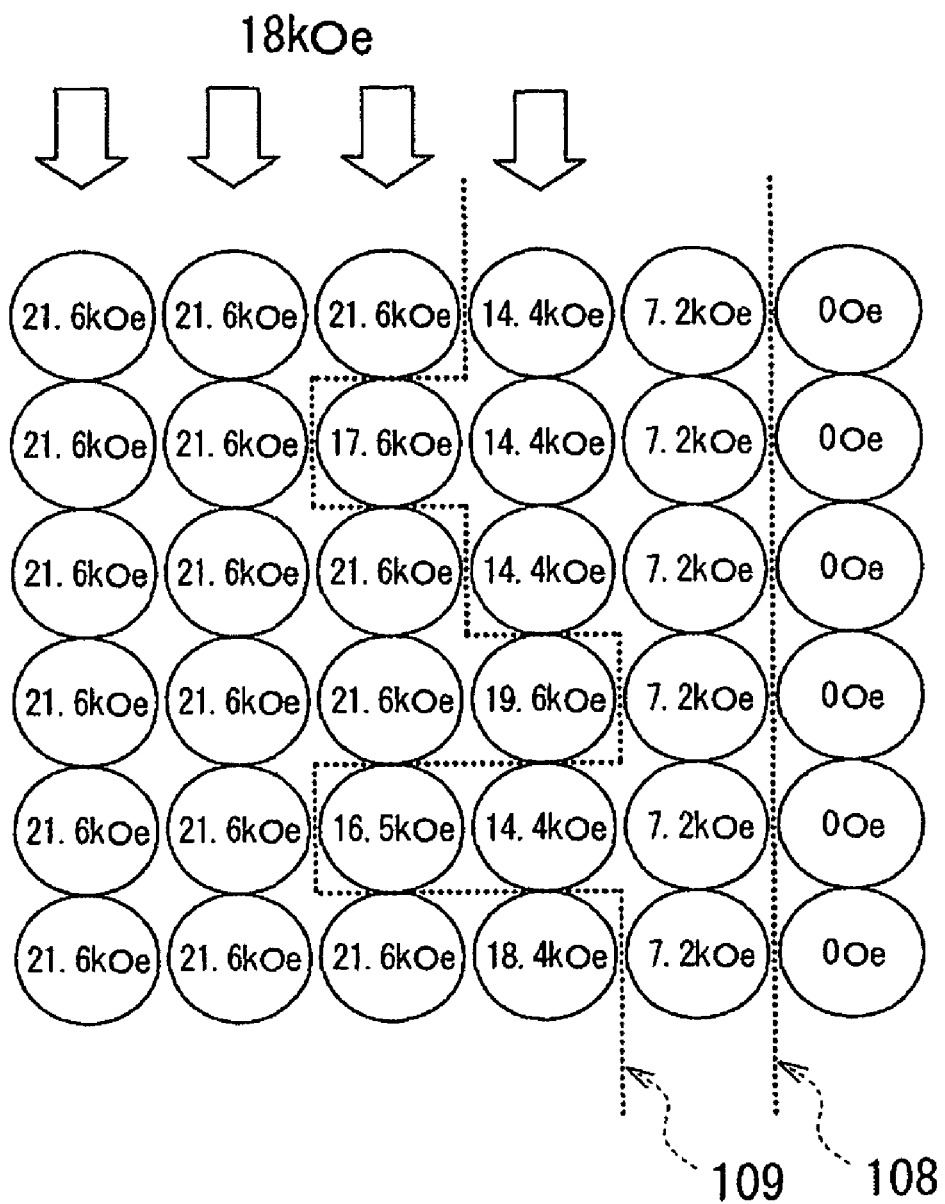
FIG. 16 is an explanatory diagram illustrating the problems with the recording method of the comparative example.

The effects of the recording method and the hard disk drive according to the present embodiment will now be described. To begin with, a recording method of a comparative example and problems with the method will be described with reference to FIG. 15 and FIG. 16. FIG. 15 is an explanatory diagram illustrating the principle of the recording method of the comparative example. FIG. 16 is an explanatory diagram illustrating the problems with the recording method of the comparative example.

FIG. 15 and FIG. 16 show a plurality of circles which denote a plurality of magnetic grains in a magnetic recording layer. Each circle has a numerical value that shows the coercivity of the magnetic grain. Note that FIG. 15 shows an ideal case where the plurality of magnetic grains have an identical coercivity at the same temperature. FIG. 16 shows a case where the plurality of magnetic grains have a coercivity distribution at the same temperature. In an actual magnetic recording layer, a plurality of magnetic grains have a coercivity distribution at the same temperature. One of the causes for a plurality of magnetic grains to have a coercivity distribution at the same temperature is that the plurality of magnetic grains have a coercivity vanishing temperature distribution.

In the comparative example, the magnetic grains have a diameter of 12 nm. In FIG. 15 and FIG. 16, the dotted line 108 shows the position at which the temperature of the magnetic recording layer agrees with the coercivity vanishing temperature of the magnetic grains. In the region on the right-hand side from this dotted line 108, the temperature of the magnetic recording layer (magnetic grains) exceeds the coercivity vanishing temperature of the magnetic grains, and the coercivity of the magnetic grains is 0 kOe. Assume that in the region between the dotted line 108 and the dotted line 109, the temperature of the magnetic recording layer decreases at a temperature gradient of 3 K/nm with increasing distance from the dotted line 108. In this region, the coercivity of the magnetic grains increases by 200 Oe for a temperature drop of 1 K. The comparative example is configured to apply a write magnetic field of 18 kOe to a position near the dotted line 109. This can be said to be a conventional recording method. In the region on the left-hand side from the dotted line 109, the coercivity of the magnetic grains exceeds the magnitude of the write magnetic field. The dotted line 109 shows the boundary between a plurality of magnetic grains whose coercivity exceeds the magnitude of the write magnetic field and a plurality of magnetic grains whose coercivity is equal to or less than the magnitude of the write magnetic field.

In an ideal case, a plurality of magnetic grains have a coercivity as shown in FIG. 15. In this case, the direction of magnetization of the plurality of magnetic grains in the region between the dotted line 108 and the dotted line 109 varies according to the direction of the write magnetic field. In contrast, the direction of magnetization of the plurality of magnetic grains in the region on the left-hand side from the dotted line 109 does not vary according to the direction of the write magnetic field. This makes it possible that the magnetic grains on one side from the dotted line 109 have a direction of magnetization different from that of the magnetic grains on the other side from the dotted line 109. In an ideal case, the dotted line 109 is a straight line.

FIG. 16 shows an example of coercivities of a plurality of magnetic grains for the case where the plurality of magnetic grains have a coercivity distribution at the same temperature. In this case, the dotted line 109 which denotes the boundary between the magnetic grains whose coercivity exceeds the magnitude of the write magnetic field and the magnetic grains whose coercivity is equal to or less than the magnitude of the write magnetic field may not be a straight line but may possibly be a bent line, for example, as shown in FIG. 16. This increases the magnetic transition width and thereby causes insufficient signal-to-noise ratios at high linear recording densities.

In contrast to this, the present embodiment can provide high linear recording densities and high signal-to-noise ratios. Now, a description will be given of simulation results that show the effects of the present embodiment. In the simulation, the relationship between the coercivity vanishing temperature distribution of a plurality of magnetic grains 104a and the signal-to-noise ratio of the hard disk medium 100 was examined by Landau-Lifshitz-Gilbert (LLG) simulation using the LLG equation.

To begin with, the relationship between the measurable coercivity and the coercivity employed in the simulation will be described. As described in Literature "M. P. Sharrock et al; IEEE Transactions on Magnetics, Vol. MAG-17, No. 6, November, 1981, p. 3020-3022", the coercivity of a magnetic grain varies according to the duration of time in which a magnetic field is applied to the magnetic grain. This literature describes an equation (hereinafter referred to as the Sharrock equation) that expresses the dependence of the coercivity on the duration of application of a magnetic field.

The coercivity as a static magnetic property that is measurable using a vibrating sample magnetometer (VSM) or a Kerr effect magnetometer is a coercivity during the duration of application of a magnetic field on the order of seconds. In the present application, such coercivity as a static magnetic property is referred to as the static coercivity. On the other hand, the duration of application of a magnetic field during a write operation is, for example, on the order of $10^{-9}$ seconds, which is much shorter than the duration of application of a magnetic field for measuring the coercivity as the static magnetic property mentioned above. Accordingly, the coercivity of a magnetic grain during the write operation is different from its static coercivity. In the present application, the coercivity during the write operation is referred to as the dynamic coercivity. Furthermore, in the present application, the coercivity without an explicit expression of "dynamic" refers to the static coercivity. The static coercivity can be measured based on a hysteresis loop. Strictly speaking, the static coercivity to be measured based on a hysteresis loop slightly varies according to the rate of change in the magnetic field that is employed to create the hysteresis loop. The static coercivity is herein defined as the value at a rate of change in the magnetic field of 60 Oe/second.

The simulation was performed using the dynamic coercivity. On the other hand, it was the static coercivity that was used to represent the characteristics of the magnetic recording layer. The static coercivity used to represent the characteristics of the magnetic recording layer and the dynamic coercivity used for the simulation were converted therebetween using the Sharrock equation.

The simulation was performed on first and second comparative examples and first to sixth practical examples described below. In the first and second comparative examples, a method different from the recording method according to the present embodiment was employed to write signals on the magnetic recording layer 104. In the first to sixth practical examples, the recording method according to the present embodiment was employed to write signals on the magnetic recording layer 104. The first and second comparative examples and the first to third practical examples were based on a hard disk medium having no cap layer 105. The fourth to sixth practical examples were based on a hard disk medium having the cap layer 105. Table 1 shows the characteristics of the magnetic recording layer 104 and the cap layer 105 on which the simulation was based. Note that in Table 1, it holds that 1 erg/cc=$1\times10^{-1}$ J/m$^3$, and 1 emu/cc=$1\times10^3$ A/m.

TABLE 1

|  | Magnetic recording layer 104 | Cap layer 105 |
|---|---|---|
| Thickness (nm) | 15 | 3 |
| Magnetic anisotropy (erg/cc) | $5\times10^6$ | $1\times10^4$ |
| Saturation magnetization (emu/cc) | 300 | 300 |
| Coercivity vanishing temperature (° C.) | 250 | 700 |

In the simulation, the magnitude of the gradient of the change in temperature of the heat applied to the magnetic recording layer 104 with respect to the change in position in the track direction was set at 5 K/nm. The linear recording density of the signal to be written on the magnetic recording layer 104 was set at 2500 kFCI (FCI stands for flux changes per inch). This can be said to be a sufficiently high linear recording density. Furthermore, the extent ΔTc of the coercivity vanishing temperature distribution of the plurality of magnetic grains 104a in the magnetic recording layer 104 was varied within the range from 10 K to 80 K.

As a parameter representing the characteristics of the magnetic recording layer 104, the present embodiment including this simulation employs dHc/dT defined below. The parameter dHc/dT is the maximum absolute value of the gradient of the change in coercivity of the magnetic recording layer 104 with respect to the change in temperature, and more specifically, the maximum absolute value of the gradient of the change in coercivity of the magnetic recording layer 104 with respect to the change in temperature within the range from Tc-max to room temperatures (25° C.).

The reasons for using dHc/dT defined as above are as follows. For the magnetic recording layer 104 of an actual hard disk medium 100, dHc/dT defined as above can be measured easily. More specifically, dHc/dT can be determined as the maximum absolute value of a differential value on a curve that represents the temperature dependence of the coercivity of the magnetic recording layer 104. Furthermore, the gradient of the change in coercivity of the magnetic recording layer 104 with respect to the change in temperature within the first adjacent region R1, which affects the write operation, is thought to be sufficiently strongly correlated with dHc/dT defined as above.

For the first comparative example, dHc/dT was set at 250 Oe/K. For the second comparative example and the first to sixth practical examples, dHc/dT was varied within the range from 60 Oe/K to 250 Oe/K.

In the first comparative example, when the coercivity of a magnetic grain 104a was 15 kOe, the magnetic grain 104a was subjected to a write magnetic field of a magnitude of 15 kOe to write the signal. Thus, in the first comparative example, a write magnetic field greater than in the present embodiment was applied to a magnetic grain 104a having a higher coercivity than in the present embodiment to write the signal. This can be said to be a conventional recording method. Table 2 lists the signal-to-noise ratio (hereinafter referred to as SNR) of the first comparative example. The SNR is expressed in dB. Theoretically, the SNR for ideal read/write operations is 7 dB.

TABLE 2

(First comparative example)

| ΔTc (K) | dHc/dT (Oe/K) 250 |
|---|---|
| 10 | 3.1 |
| 20 | 2.3 |
| 40 | 1.5 |
| 60 | 0.4 |
| 80 | 0 |

In the second comparative example and the first to sixth practical examples, a write magnetic field of a predetermined magnitude was applied to the first adjacent region R1 of the magnetic recording layer 104 to write the signal. For the first practical example, the magnitude of the write magnetic field to be applied to the first adjacent region R1 was set at 1 kOe. Table 3 lists the SNR of the first practical example.

TABLE 3

(First practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 5.1 | 5.0 | 4.1 | 3.6 | 3.5 | 3.2 | 3.2 |
| 20 | 3.0 | 4.3 | 3.8 | 3.7 | 3.6 | 3.8 | 3.0 |
| 40 | 1.8 | 2.1 | 2.9 | 3.7 | 3.7 | 3.8 | 2.8 |
| 60 | 1.4 | 1.9 | 2.2 | 1.8 | 1.8 | 1.7 | 1.3 |
| 80 | 1.0 | 1.1 | 0.7 | 0.4 | 0.1 | −0.1 | 0.0 |

For the second practical example, the magnitude of the write magnetic field to be applied to the first adjacent region R1 was set at 2 kOe. Table 4 lists the SNR of the second practical example.

TABLE 4

(Second practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 5.2 | 5.4 | 4.6 | 4.1 | 3.8 | 3.6 | 3.4 |
| 20 | 2.9 | 3.6 | 3.7 | 3.8 | 3.6 | 3.2 | 2.9 |
| 40 | 1.7 | 2.1 | 2.9 | 3.1 | 3.2 | 3.4 | 2.7 |
| 60 | 1.4 | 2.6 | 3.0 | 2.8 | 2.4 | 2.0 | 1.4 |
| 80 | 1.0 | 1.1 | 0.7 | 0.4 | 0.1 | −0.1 | 0.0 |

For the third practical example, the magnitude of the write magnetic field to be applied to the first adjacent region R1 was set at 3 kOe. Table 5 lists the SNR of the third practical example.

TABLE 5

(Third practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 4.5 | 4.7 | 3.9 | 3.4 | 3.3 | 3.2 | 3.2 |
| 20 | 2.9 | 3.3 | 3.2 | 3.2 | 3.2 | 3.1 | 2.7 |
| 40 | 1.5 | 2.0 | 2.4 | 2.9 | 2.3 | 2.0 | 1.8 |
| 60 | 1.1 | 2.1 | 2.6 | 2.4 | 1.8 | 1.7 | 1.1 |
| 80 | 0.4 | 0.5 | 0.0 | 0.0 | 0.0 | 0.0 | 0.0 |

For the second comparative example, the magnitude of the write magnetic field to be applied to the first adjacent region R1 was set at 4 kOe. Table 6 lists the SNR of the second comparative example.

TABLE 6

(Second comparative example)

| | dHc/dT (Oe/K) | | | | | | |
|---|---|---|---|---|---|---|---|
| ΔTc (K) | 60 | 70 | 120 | 165 | 190 | 220 | 250 |
| 10 | 1.8 | 1.9 | 1.9 | 1.5 | 1.2 | 1.1 | 1.0 |
| 20 | 1.6 | 1.6 | 1.8 | 1.2 | 0.4 | 0.5 | 0.6 |
| 40 | 1.5 | 1.5 | 1.4 | 1.0 | 0.2 | 0.2 | 0.3 |
| 60 | 1.2 | 1.3 | 1.2 | 0.3 | 0.0 | 0.0 | −0.2 |
| 80 | 0.0 | 0.0 | 0.0 | 0.0 | 0.0 | 0.0 | 0.0 |

For the fourth practical example, the magnitude of the write magnetic field to be applied to the first adjacent region R1 was set at 1 kOe. Table 7 lists the SNR of the fourth practical example.

TABLE 7

(Fourth practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 6.1 | 6.0 | 5.1 | 4.6 | 4.5 | 4.2 | 4.2 |
| 20 | 4.2 | 5.5 | 5.0 | 4.9 | 4.8 | 5.0 | 4.2 |
| 40 | 3.2 | 3.5 | 4.3 | 5.1 | 5.1 | 5.2 | 4.2 |
| 60 | 2.9 | 3.4 | 3.7 | 3.3 | 3.3 | 3.2 | 2.8 |
| 80 | 2.5 | 2.6 | 2.2 | 1.9 | 1.6 | 1.4 | 1.5 |

For the fifth practical example, the magnitude of the write magnetic field to be applied to the first adjacent region R1 was set at 2 kOe. Table 8 lists the SNR of the fifth practical example.

TABLE 8

(Fifth practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 6.2 | 6.4 | 5.6 | 5.1 | 4.8 | 4.6 | 4.4 |
| 20 | 4.1 | 4.8 | 4.9 | 5.0 | 4.8 | 4.4 | 4.1 |
| 40 | 3.1 | 3.5 | 4.3 | 4.5 | 4.6 | 4.8 | 4.1 |
| 60 | 2.9 | 4.1 | 4.5 | 4.3 | 3.9 | 3.5 | 2.9 |
| 80 | 2.5 | 2.6 | 2.2 | 1.9 | 1.6 | 1.4 | 1.5 |

For the sixth practical example, the magnitude of the write magnetic field to be applied to the first adjacent region R1 was set at 3 kOe. Table 9 lists the SNR of the sixth practical example.

TABLE 9

(Sixth practical example)

| | dHc/dT (Oe/K) | | | | | | |
|---|---|---|---|---|---|---|---|
| ΔTc (K) | 60 | 70 | 120 | 165 | 190 | 220 | 250 |
| 10 | 5.5 | 5.7 | 4.9 | 4.4 | 4.3 | 4.2 | 4.2 |
| 20 | 4.1 | 4.5 | 4.4 | 4.4 | 4.4 | 4.3 | 3.9 |

TABLE 9-continued (Sixth practical example)

| | dHc/dT (Oe/K) | | | | | |
|---|---|---|---|---|---|---|
| ΔTc (K) | 60 | 70 | 120 | 165 | 190 | 220 | 250 |
| 40 | 2.9 | 3.4 | 3.8 | 4.3 | 3.7 | 3.4 | 3.2 |
| 60 | 2.6 | 3.6 | 4.1 | 3.9 | 3.3 | 3.2 | 2.6 |
| 80 | 1.9 | 2.0 | 1.5 | 1.5 | 1.5 | 1.5 | 1.5 |

For the first comparative example (Table 2), the SNR increases with decreasing ΔTc, and shows the maximum value of 3.1 dB when ΔTc is 10 K. For an actual magnetic recording layer 104, the value of 10 K for ΔTc is a very small value. Therefore, the conventional recording method can hardly realize an SNR higher than 3.1 dB. In this context, an SNR of 3.1 dB or higher would be thought to be sufficiently high.

For the first to third practical examples (Tables 3 to 5) where the magnitude of the write magnetic field applied to the first adjacent region R1 is 3 kOe or smaller, SNRs higher than 3.1 dB are obtained with dHc/dT of a wide range from 60 to 250 Oe/K at least when ΔTc is 10 K. For the second comparative example (Table 6) where the magnitude of the write magnetic field applied to the first adjacent region R1 is 4 kOe, SNRs obtained are lower than those of the first comparative example. These results show that a sufficiently high SNR can be obtained by applying a write magnetic field of 3 kOe or smaller to the first adjacent region R1 as in the present embodiment.

In the present embodiment, a coercivity of the magnetic grains 104a is generated in the first adjacent region R1, and when observed at the boundary between the first adjacent region R1 and the second adjacent region R2, the magnitude of the coercivity of the magnetic grains 104a is equal to or higher than the magnitude of the write magnetic field. Therefore, when a plurality of magnetic grains 104a have low coercivities in a small distribution in the first adjacent region R1, a relatively weak write magnetic field is applied to those plurality of magnetic grains 104a so as to control the direction of magnetization of the plurality of magnetic grains 104a. According to the present embodiment, this serves to provide a high SNR.

For the first to third practical examples (Tables 3 to 5), SNRs of 3.1 dB or higher are obtained with dHc/dT within the range of 70 to 220 Oe/K not only when ΔTc is 10 K but also when ΔTc is 20 K. It is therefore preferable that dHc/dT fall within the range of 70 to 220 Oe/K.

For the first and second practical examples (Tables 3 the 4) where the magnitude of the write magnetic field applied to the first adjacent region R1 is 2 kOe or smaller, SNRs of 3.1 db or higher are obtained with dHc/dT within the range of 165 to 220 Oe/K and ΔTc of 40 K or smaller. It is therefore more preferable that the magnitude of the write magnetic field applied to the first adjacent region R1 be 2 kOe or smaller and that dHc/dT fall within the range of 165 to 220 Oe/K.

For the fourth to sixth practical examples (Tables 7 to 9) which include the cap layer 105, SNRs obtained are higher by 1.0 to 1.5 dB as a whole than those obtained by the first to third practical examples (Tables 3 to 5) which include no cap layer 105. The cap layer 105 greatly serves to improve SNR especially in the case of ΔTc being as high as 60 to 80 K where SNR would be reduced in the absence of the cap layer 105. In view of these facts, it is preferred that the hard disk medium 100 include the cap layer 105.

Furthermore, the fourth to sixth practical examples (Tables 7 to 9) show SNRs higher than 3.1 dB with dHc/dT within the range of 70 to 220 Oe/K and ΔTc of 60 K or smaller. In view of this, it is preferred that the hard disk medium 100 include the cap layer 105, dHc/dT fall within the range of 70 to 220 Oe/K, and ΔTc be 60 K or smaller.

A method for measuring the coercivity Hc of the magnetic recording layer 104 will now be described with reference to FIG. 17. This method uses a layered structure that is formed in the process of manufacturing the hard disk medium 100, with no cap layer 105 formed yet thereon. Specifically, the substrate 101, and the soft magnetic layer 102, the orientation layer 103 and the magnetic recording layer 104 stacked on the substrate 101 constitute the layered structure. This method determines a hysteresis loop (hereinafter referred to as the $\theta_K$–H hysteresis loop) by measuring the Kerr rotation angle $\theta_K$ of the magnetic recording layer 104 of the layered structure while varying the magnitude of the magnetic field H applied to the magnetic recording layer 104, by using a Kerr effect magnetometer. The Kerr rotation angle $\theta_K$ of the magnetic recording layer 104 can be obtained by irradiating the magnetic recording layer 104 with linear polarized light, detecting a beam of light reflected on the magnetic recording layer 104, and measuring the angle of rotation of the polarization plane of the reflected beam relative to the polarization plane of the incident beam.

The conditions for determining the aforementioned $\theta_K$–H hysteresis loop are as follows. The light irradiating the magnetic recording layer 104 forms a spot of a diameter of 1 mm on the magnetic recording layer 104. The diameter of the spot is defined as the diameter of the annular contour line of the radiation intensity that is $1/e^2$ the radiation intensity at the center of the spot. The light has a wavelength of 350 nm. The magnetic field H is applied to the magnetic recording layer 104 in the direction along the easy axis of magnetization of the magnetic grains 104a, that is, in the direction of thickness of the magnetic recording layer 104. The rate of change of the magnetic field H is 60 Oe/second. The magnetic field H varies in the range from −20 kOe to 20 kOe.

Figure 17:
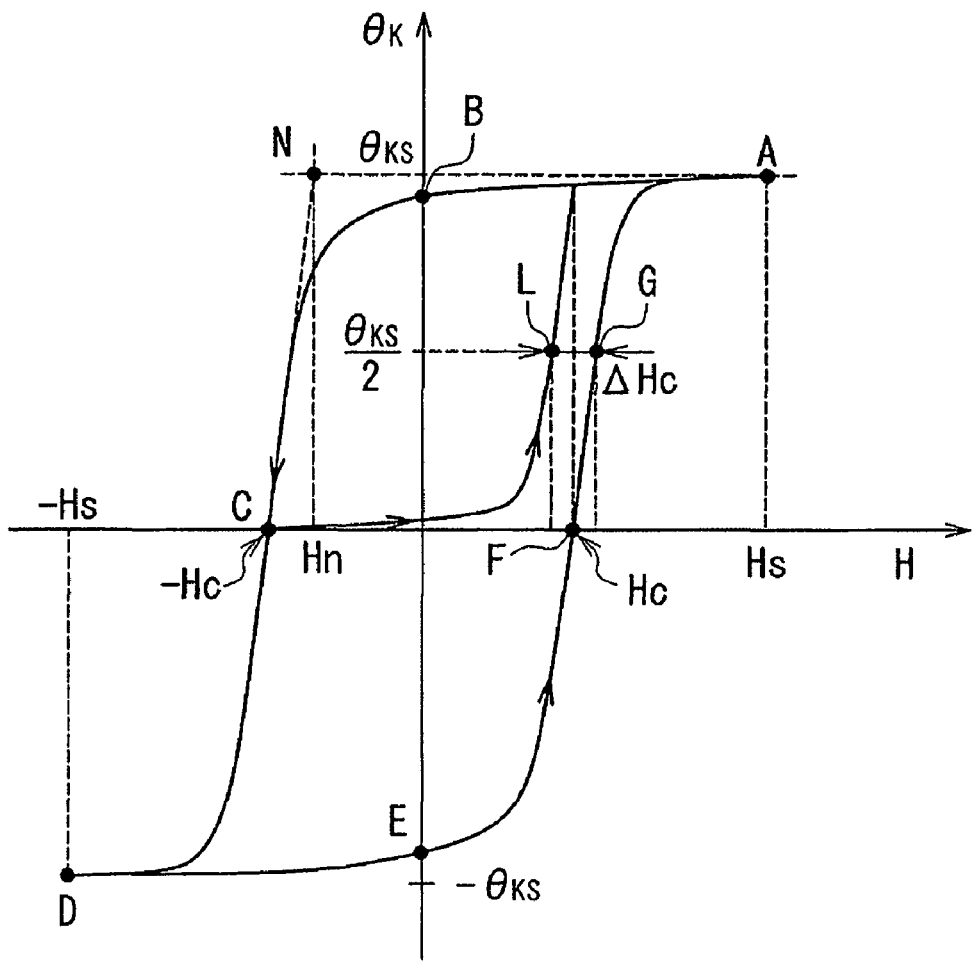
FIG. 17 is an explanatory diagram for explaining a method of measuring the coercivity of the magnetic recording layer.

FIG. 17 shows an example of the $\theta_K$–H hysteresis loop. In FIG. 17, the horizontal axis represents the magnetic field H applied to the magnetic recording layer 104, and the vertical axis represents the Kerr rotation angle $\theta_K$ of the magnetic recording layer 104. Now, a description will be made on the $\theta_K$–H hysteresis loop shown in FIG. 17. As the magnetic field H is increased from 0, the Kerr rotation angle $\theta_K$ increases and reaches the maximum value $\theta_{KS}$ at Point A in FIG. 17. The magnitude of the magnetic field H at Point A is the saturation field Hs. As the magnetic field H is reduced from Point A, the Kerr rotation angle $\theta_K$ decreases via Points B and C and then reaches Point D. At Point B, the magnetic field H is zero. At Point C, the Kerr rotation angle $\theta_K$ is zero. The magnitude of the magnetic field H at Point C is −Hc. At Point D, the Kerr rotation angle $\theta_K$ becomes $-\theta_{KS}$, while the magnetic field H becomes −Hs.

As the magnetic field H is increased from Point D, the Kerr rotation angle $\theta_K$ increases via Points E, F, and G to reach Point A. At Point E, the magnetic field H is zero. At Point F, the Kerr rotation angle $\theta_K$ is zero. The magnitude of the magnetic field at Point F is the coercivity Hc. At Point G, the magnitude of the Kerr rotation angle $\theta_K$ is $\theta_{KS}/2$. The closed loop via Points A, B, C, D, E, F, G, and A described above is called the major loop. As shown in FIG. 17, a point of intersection of the tangent to the major loop at Point C and a straight line that passes through Point A in parallel to the horizontal axis is assumed to be Point N. The magnitude of the magnetic field H at Point N is the nucleation field Hn.

The coercivity Hc of the magnetic recording layer 104 can be measured based on the $\theta_K$–H hysteresis loop described above. By determining the $\theta_K$–H hysteresis loop for different temperatures, the temperature dependence of the coercivity Hc of the magnetic recording layer 104 can also be determined. This in turn makes it possible to find dHc/dT.

Figure 18:
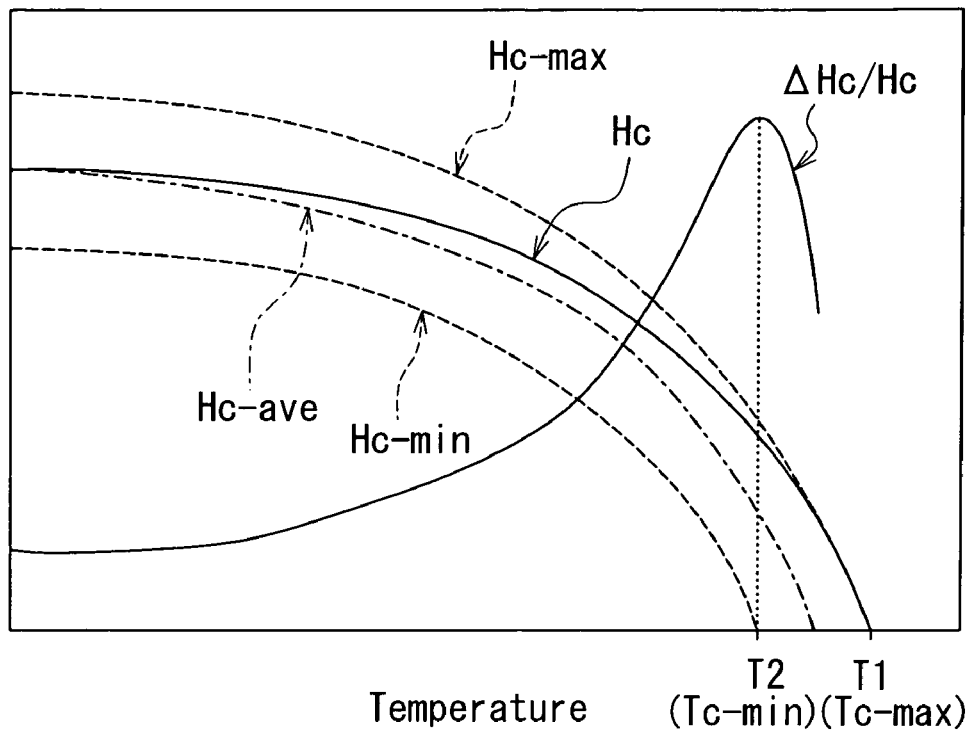
FIG. 18 is an explanatory diagram for explaining a method of measuring the extent of distribution of the coercivity vanishing temperatures of the plurality of magnetic grains of the magnetic recording layer.

Reference is now made to FIG. 17 and FIG. 18 to describe a method for measuring the extent ΔTc of the coercivity vanishing temperature distribution of a plurality of magnetic grains 104a in the magnetic recording layer 104. FIG. 18 schematically shows the temperature dependence of the Hc-max, Hc-min and Hc-ave shown in FIG. 2, the coercivity Hc of the magnetic recording layer 104, and a parameter ΔHc/Hc to be described later. In FIG. 18, the horizontal axis represents the temperature of the magnetic recording layer 104, where the temperature increases toward the right. In FIG. 18, the vertical axis represents the coercivity and ΔHc/Hc, where their values increase in the upward direction.

As shown in FIG. 18, Hc is equal or nearly equal to Hc-ave at room temperatures. As the temperature increases, the coercivity of the magnetic grains 104a decreases and accordingly, Hc also decreases. In that process, Hc approaches Hc-max. This is because as the coercivity of a plurality of magnetic grains 104a decreases, the coercivity Hc of the magnetic recording layer 104 depends more greatly on a relatively higher coercivity in the coercivity distribution of the plurality of magnetic grains 104a. Then, Hc becomes substantially 0 for the first time when Hc-max becomes substantially 0. The ΔTc measurement method determines the temperature dependence of Hc to find a first temperature T1 which is the lowest temperature at which the absolute value of Hc is at the minimum value, i.e., substantially 0. As can be seen from FIG. 18, the first temperature T1 is equal or nearly equal to the maximum value Tc-max in the coercivity vanishing temperature distribution of the plurality of magnetic grains 104a. Based on the principle described above, it is possible to determine the first temperature T1 which is equal or nearly equal to Tc-max, from the temperature dependence of Hc.

Furthermore, the ΔTc measurement method determines the temperature dependence of the parameter ΔHc/Hc. As described in Literature "I. TAGAWA and Y. NAKAMURA; IEEE Transactions on Magnetics, Vol. 27, No. 6, November, 1991, p. 4975-4977" (hereinafter referred to as Literature "TAGAWA and NAKAMURA"), ΔHc/Hc is related to a value σ/Hc obtained by dividing the standard deviation σ of the coercivity distribution of a plurality of magnetic grains 104a in the magnetic recording layer 104 by the coercivity Hc of the magnetic recording layer 104.

Now, how to determine ΔHc and ΔHc/Hc will be described with reference to FIG. 17. First, a minor curve is determined by increasing the magnetic field H from Point C on the $\theta_K$–H hysteresis loop shown in FIG. 17 to pass through Point L. At Point L on the minor curve, the magnitude of the Kerr rotation angle $\theta_K$ becomes $\theta_{KS}/2$. Then, the difference between the magnitude of the magnetic field H at Point G on the major loop and the magnitude of the magnetic field H at Point L mentioned above is determined. This difference is ΔHc. ΔHc is a value related to the extent of the coercivity distribution of the plurality of magnetic grains 104a. More specifically, as described in Literature "TAGAWA and NAKAMURA", ΔHc is equal to 1.35σ. Then, ΔHc/Hc is determined. Here, Hc is the coercivity of the magnetic recording layer 104 determined from the major loop. In this manner, ΔHc/Hc can be determined based on the $\theta_K$–H hysteresis loop.

The ΔTc measurement method determines the $\theta_K$–H hysteresis loop of the magnetic recording layer 104 for different temperatures, and finds the temperature dependence of the parameter ΔHc/Hc based on this hysteresis loop. Then, the method determines a second temperature T2 which is the temperature of the magnetic recording layer 104 at which ΔHc/Hc takes on the maximum value.

Reference is now made to FIG. 18 to describe what is meant by the second temperature T2. As the temperature of the magnetic recording layer 104 increases to approach the temperature at which Hc-min becomes 0, ΔHc/Hc increases because Hc abruptly decreases while ΔHc does not vary so drastically. On the other hand, when the temperature of the magnetic recording layer 104 becomes equal to or higher than the temperature at which Hc-min becomes 0, there occurs an increase in the number of the magnetic grains 104a whose coercivity becomes 0 with increasing temperature. This causes ΔHc to abruptly decrease. Thus, ΔHc/Hc takes on the maximum value at the temperature at which Hc-min becomes 0. The temperature at which Hc-min becomes 0 is equal or nearly equal to the lowest coercivity vanishing temperature Tc-min in the coercivity vanishing temperature distribution of the plurality of magnetic grains 104a. The second temperature T2 is the temperature of the magnetic recording layer 104 at which ΔHc/Hc takes on the maximum value, that is, the temperature at which Hc-min becomes 0. Accordingly, the second temperature T2 is equal or nearly equal to Tc-min. The second temperature T2 which is equal or nearly equal to Tc-min can thus be determined.

As can be seen from the above discussions, T1-T2 is equal or nearly equal to the extent ΔTc of the coercivity vanishing temperature distribution of the plurality of magnetic grains 104a. Accordingly, let T1-T2 be ΔTc.

Figure 19:
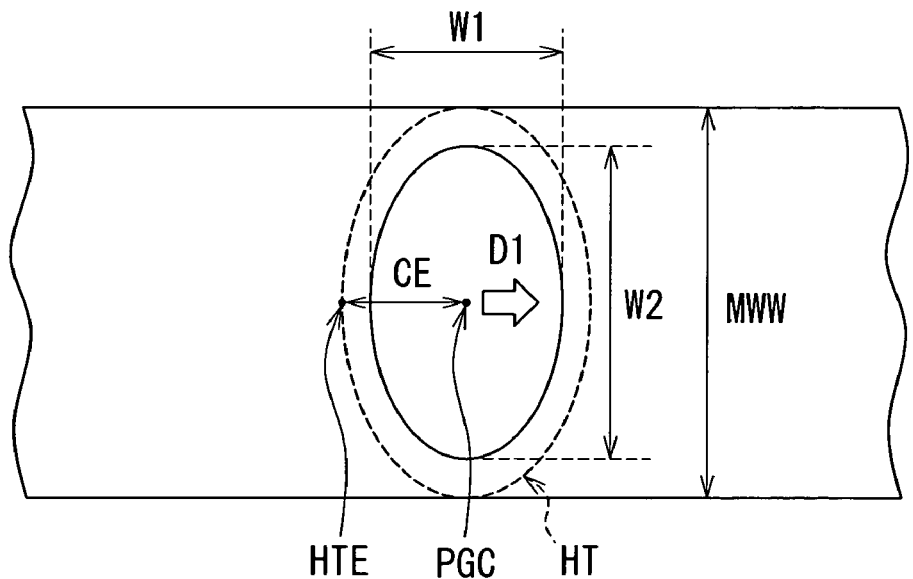
FIG. 19 is an explanatory diagram for explaining a method of identifying the position in the magnetic recording layer to which a write magnetic field of a magnitude of 3 kOe or smaller is applied in the first embodiment of the invention.

In the present embodiment, as described above, a write magnetic field is applied to the hard disk medium 100 such that the magnitude Hz of the write magnetic field applied to a predetermined position in the magnetic recording layer 104 is 3 kOe or smaller. The predetermined position is the position of at least one magnetic grain 104a that is adjacent to the rear end HTE of the high-temperature region HT. Reference is now made to FIG. 19 to describe a method for identifying the predetermined position in the magnetic recording layer 104 to which a write magnetic field of a magnitude of 3 kOe or smaller is applied in an actual hard disk drive. This method identifies the predetermined position using the diameter of the optical spot that is formed on the surface of the hard disk medium 100 by the beam of light (near-field light) irradiating the hard disk medium 100 and the effective track width (hereinafter referred to as the MWW).

FIG. 19 is an explanatory diagram for explaining the method for identifying the predetermined position. In FIG. 19, the solid-line ellipse shows the shape of the optical spot that the beam of light irradiating the hard disk medium 100 forms on the surface of the hard disk medium 100. Symbol PGC denotes the center of the spot. On the other hand, the broken-line ellipse denotes the high-temperature region HT formed in the magnetic recording layer 104. The shape of the high-temperature region HT is similar to the shape of the spot. Furthermore, the center of the high-temperature region HT is located immediately below the center PGC of the spot. Note that the shapes of the high-temperature region HT and the spot are not limited to the ellipse, but may also be circular or rectangular.

The shape of the spot formed on the surface of the hard disk medium 100 can be recognized by the method described in, for example, Literature "T. Matsumoto et al; OPTICS LETTERS, Vol. 31, No. 2, Jan. 15, 2006, p. 259-261". This literature describes a method for observing a record mark which is formed in the recording layer of a phase-change recording medium by means of a beam of light that irradiates the phase-change recording medium. To identify the predetermined position, the method described in this literature is used to recognize the shape of the spot.

To identify the predetermined position, first, with a slider 10 in contact with a phase-change recording medium, the phase-change recording medium is irradiated with a beam of light that is used for the recording method according to the present embodiment. The recording layer of the phase-change recording medium is made of amorphous $Ge_2Sb_2Te$, for example. The irradiated portion of the recording layer undergoes a phase change from amorphous to crystalline. Then, the phase-change recording medium is soaked into an alkaline etchant to etch the recording layer. This causes the irradiated portion of the recording layer to be recessed with respect to the area therearound. The shape of this recess can be regarded as the shape of the spot formed on the surface of the hard disk medium 100. Accordingly, by observing this recess using, for example, a scanning electron microscope (SEM), it is possible to recognize the shape of the spot formed on the surface of the hard disk medium 100.

The distance CE from the center of the high-temperature region HT immediately below PGC to at least one magnetic grain 104a adjacent to the rear end HTE of the high-temperature region HT is nearly equal to the radius (the shorter radius in FIG. 19) of the high-temperature region HT in the track direction (the horizontal direction in FIG. 19). The radius (the longer radius in FIG. 19) of the high-temperature region HT in the track width direction TW (the vertical direction in FIG. 19) is nearly equal to MWW. As described above, the shape of the high-temperature region HT is similar to the shape of the spot. Accordingly, the distance CE is expressed by Equation (1) below, where symbol W1 represents the radius of the spot in the track direction (the shorter radius), and symbol W2 represents the radius of the spot in the track width direction TW (the longer radius), $$CE = MWW \times (W1/W2)/2 \qquad (1).$$

The predetermined position is apart by the distance CE, which is expressed by MWW×(W1/W2)/2, from the position immediately below the center of the spot in the magnetic recording layer 104 in the direction opposite to the direction D1 of movement of the spot. The center PGC of the spot can be identified from the position of the magnetic head 1, more specifically, from the position of the near-field light generating edge 42g of the plasmon generator 42 (the light generating element). The predetermined position can therefore be identified from the position of the magnetic head 1 and Equation (1).

Note that MWW is the full width at half maximum of the read waveform in the track width direction TW. The read waveform in the track width direction TW can be created by varying the position of the magnetic head 1 in the track width direction TW and determining the read output at each position.

Now, a description will be made on the results of an experiment that was conducted to demonstrate the effects of the recording method according to the present embodiment. For the experiment, hard disk media 100 having the structure shown in Table 10 below were fabricated, and a signal of a linear recording density of 2500 kFCI was written on the hard disk media 100. Then, the written signal was read to determine the SNRs of the hard disk media 100. The magnetic recording layers 104 were subjected to a write magnetic field of 1 kOe.

TABLE 10

| | Component | Thickness |
| --- | --- | --- |
| Protection layer 106 | Diamond-like carbon | 3 nm |
| Cap layer 105 | CoFe-based amorphous continuous film | 3 nm |
| Magnetic recording layer 104 | CoB/Pd multilayer film | 15 nm |
| Orientation layer 103 | Ru | 20 nm |
| Soft magnetic layer 102 | CoFe alloy | 50 nm |
| Substrate 101 | Glass substrate | 0.6 mm |

For the experiment, two hard disk media 100 were fabricated with Pd layers of different thicknesses included in the respective magnetic recording layers 104. The magnetic recording layers 104 of these two hard disk media 100 were 70.2 Oe/K and 219.7 Oe/K in dHc/dT, respectively. The two hard disk media 100 were 59.8 K in ΔTc. Table 11 shows the results of the experiment.

TABLE 11

| | dHc/dT (Oe/K) | |
| --- | --- | --- |
| ΔTc (K) | 70.2 | 219.7 |
| 59.8 | 3.5 dB | 3.2 dB |

The above experimental results also show that the present embodiment can provide high linear recording density and high signal-to-noise ratio.

Second Embodiment

Figure 20:
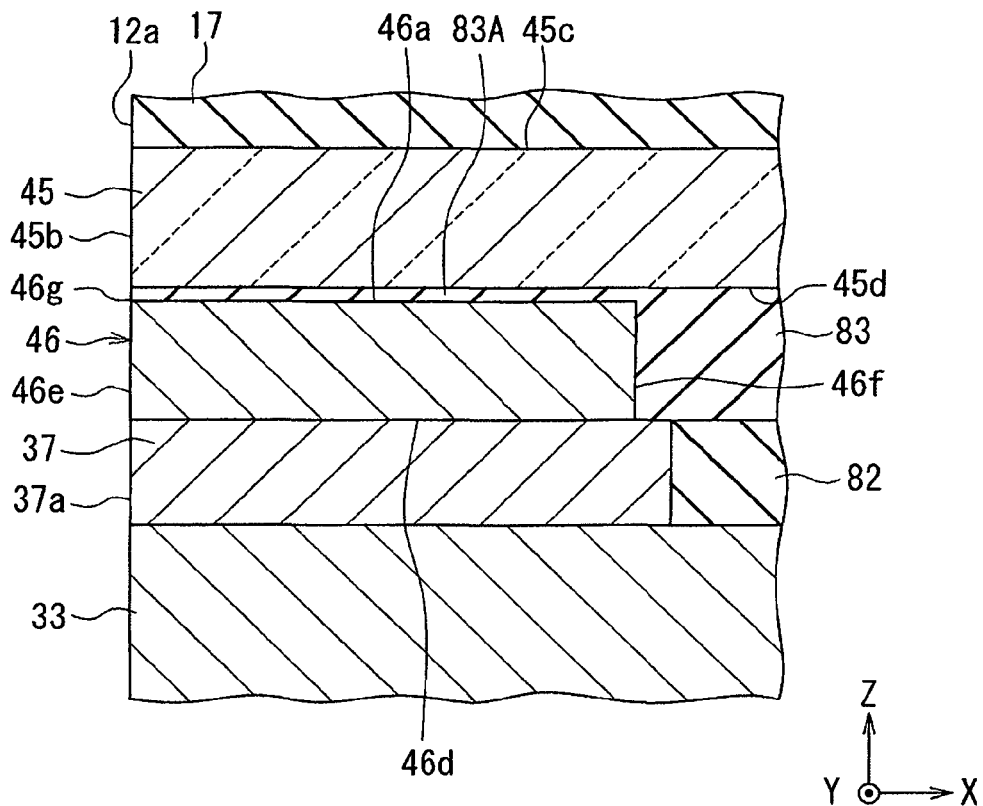
FIG. 20 is a cross-sectional view of a main part of a magnetic head of a second embodiment of the invention.
Figure 21:
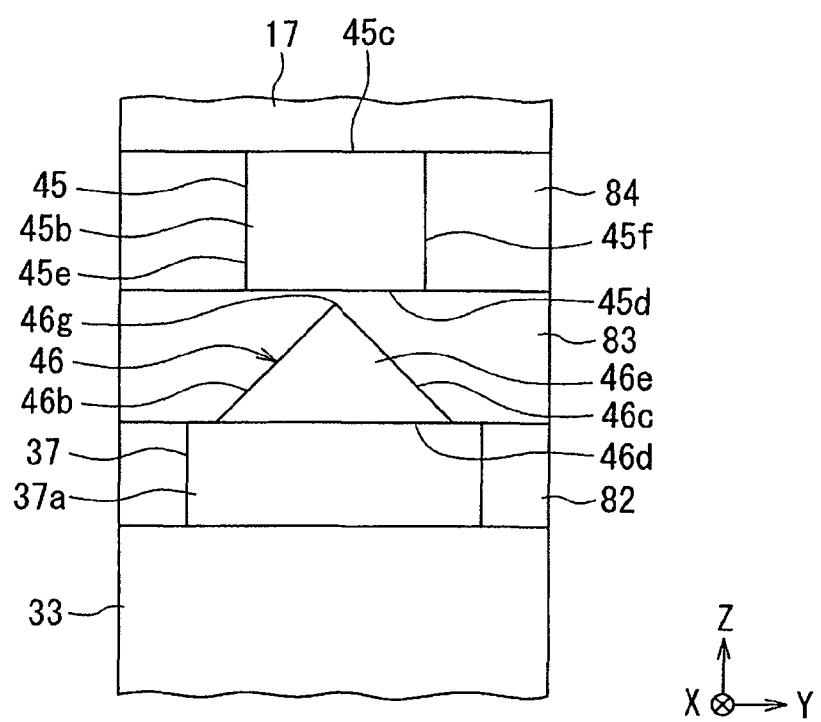
FIG. 21 is a front view of the main part of the magnetic head of the second embodiment of the invention.
Figure 22:
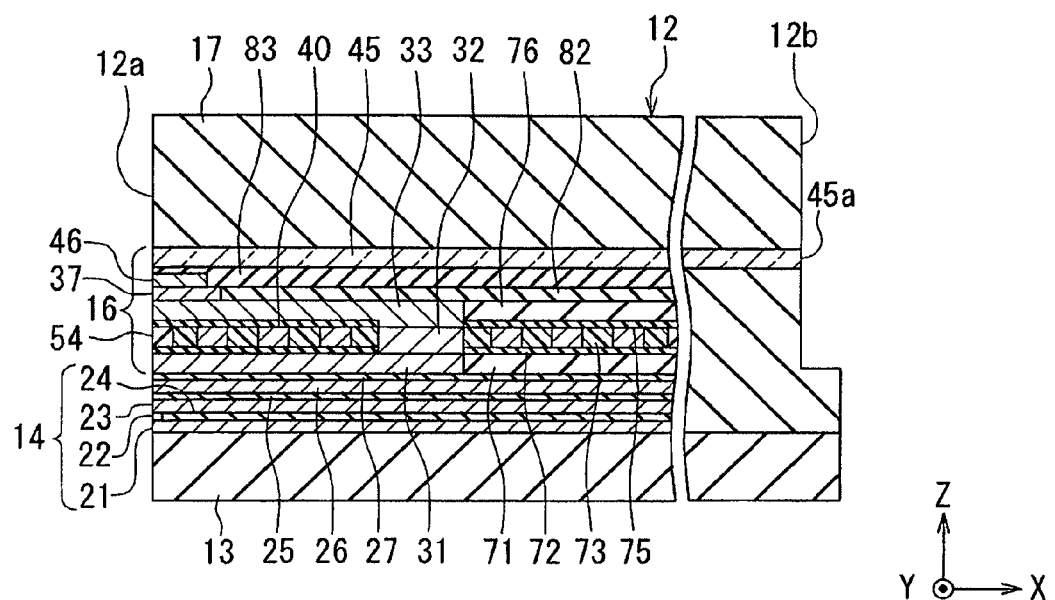
FIG. 22 is a cross-sectional view of the magnetic head of the second embodiment of the invention.

A second embodiment of the present invention will now be described with reference to FIG. 20 to FIG. 22. FIG. 20 is a cross-sectional view of a main part of a magnetic head of the present embodiment. FIG. 21 is a front view of the main part of the magnetic head of the present embodiment. FIG. 22 is a cross-sectional view of the magnetic head of the present embodiment.

The write head 16 of the present embodiment is different from the write head 16 of the first embodiment in the following respects. The write head 16 of the present embodiment has a magnetic pole 37, a core 45, a plasmon generator 46 and clad layers 83 and 84, instead of the magnetic pole 36, the core 41, the plasmon generator 42 (heating element 42) and the clad layers 78, 79 and 80 of the first embodiment. The present embodiment is without the coupling layers 34 and 35, the cooling layer 43 and the insulating layers 77 and 81 of the first embodiment.

The magnetic pole 37 is disposed on the yoke layer 33. As shown in FIG. 20 and FIG. 21, the magnetic pole 37 has an end face 37a located in the medium facing surface 12a. The end face 37a is rectangular in shape, for example. The write head 16 of the present embodiment further has an insulating layer 82 disposed around the magnetic pole 37 on the yoke layer 33 and the insulating layer 76. The top surfaces of the magnetic pole 37 and the insulating layer 82 are even with each other.

The plasmon generator 46 is disposed on the magnetic pole 37. The clad layer 83 is disposed to cover the magnetic pole 37, the plasmon generator 46 and the insulating layer 82. The core 45 is disposed on the clad layer 83. The clad layer 84 is disposed around the core 45 on the clad layer 83. The top surfaces of the core 45 and the clad layer 83 are even with each other.

The core 45 extends in the direction perpendicular to the medium facing surface 12a (the X direction). As shown in FIG. 20 to FIG. 22, the core 45 has an incidence end 45a, a front end face 45b located in the medium facing surface 12a, a top surface 45c, an evanescent light generating surface 45d or a bottom surface, and two side surfaces 45e and 45f. The evanescent light generating surface 45d generates evanescent light based on the light propagating through the core 45. The core 45 propagates laser light that is emitted from the laser diode 160 and incident on the incidence end 45a.

The plasmon generator 46 is disposed below the core 45 in the vicinity of the medium facing surface 12a. The plasmon generator 46 has an outer surface including a plurality of portions described below, and a near-field light generating edge 46g located in the medium facing surface 12a. As shown in FIG. 20, the outer surface of the plasmon generator 46 includes a propagative edge 46a. The propagative edge 46a faces the evanescent light generating surface 45d with a predetermined distance therefrom, and extends in the direction perpendicular to the medium facing surface 12a. The propagative edge 46a propagates plasmons. The near-field light generating edge 46g lies at an end of the propagative edge 46a.

As shown in FIG. 20, the part of the clad layer 83 interposed between the evanescent light generating surface 45d and the propagative edge 46a forms a buffer part 83A having a refractive index lower than that of the core 45.

As shown in FIG. 21, the outer surface of the plasmon generator 46 further includes a first inclined surface 46b and a second inclined surface 46c that are each connected to the propagative edge 46a and that increase in distance from each other with increasing distance from the propagative edge 46a.

As shown in FIG. 20 and FIG. 21, the outer surface of the plasmon generator 46 further includes a bottom surface 46d that connects the respective bottom ends of the first inclined surface 46b and the second inclined surface 46c to each other, a front end face 46e located in the medium facing surface 12a, and a rear end face 46f opposite to the front end face 46e. The front end face 46e is triangular in shape. The bottom surface 46d is in contact with the top surface of the magnetic pole 37.

The remainder of configuration, function and effects of the present embodiment are similar to those of the first embodiment.

Third Embodiment

Figure 25:
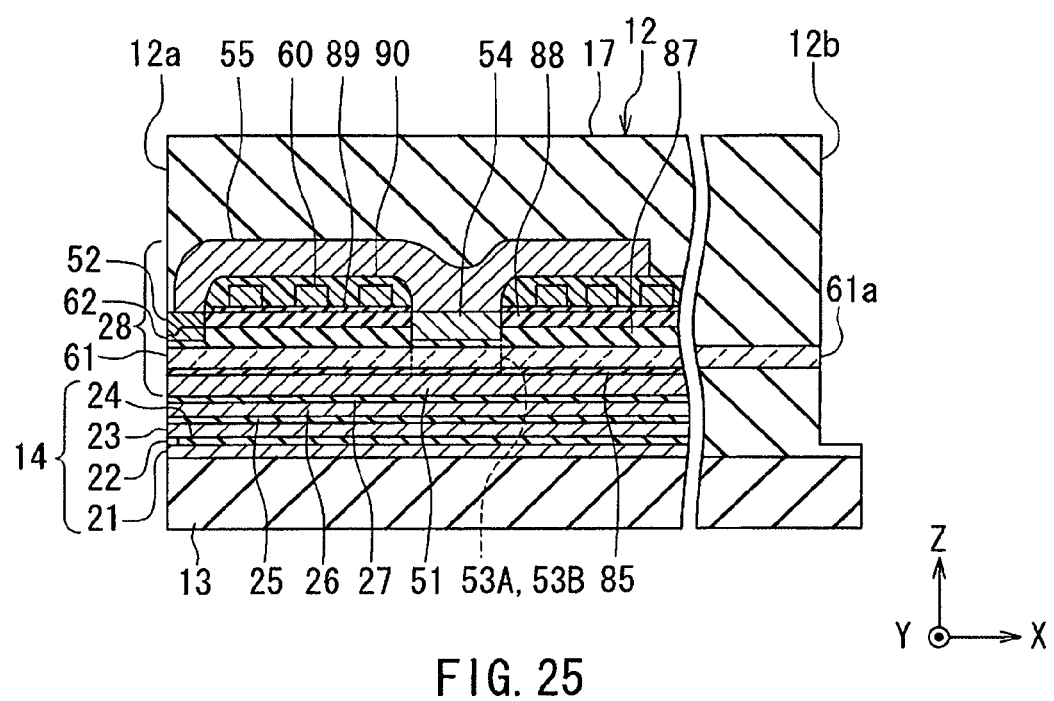
FIG. 25 is a cross-sectional view of the magnetic head of the third embodiment of the invention.

A third embodiment of the present invention will now be described with reference to FIG. 25. FIG. 25 is a cross-sectional view of the magnetic head of the present embodiment. The head unit 12 of the present embodiment has a write head 28 instead of the write head 16 of the first embodiment.

The write head 28 has a return yoke layer 51 disposed on the insulating layer 27, and a not-shown insulating layer disposed around the return yoke layer 51 on the insulating layer 27. The return yoke layer 51 is made of a soft magnetic material. The top surfaces of the return yoke layer 51 and the not-shown insulating layer are even with each other.

The write head 28 further includes a waveguide including a core 61 and a clad. The clad includes clad layers 85, 86, and 87. The clad layer 85 is disposed over the return yoke layer 51 and the not-shown insulating layer. The core 61 is disposed on the clad layer 85. The clad layer 86 is disposed around the core 61 on the clad layer 85. The top surfaces of the core 61 and the clad layer 86 are even with each other. The clad layer 87 is disposed over the core 61 and the clad layer 86.

The core 61 extends in the direction perpendicular to the medium facing surface 12a (the X direction). The core 61 has an incidence end 61a, and a front end face opposite thereto. The core 61 propagates laser light that is emitted from the laser diode 160 and incident on the incidence end 61a.

The write head 28 further includes a plasmon generator 62 disposed above the core 61 in the vicinity of the medium facing surface 12a, and a magnetic pole 52 disposed at such a position that the plasmon generator 62 is interposed between the magnetic pole 52 and the core 61. The configurations and arrangement of the core 61, the plasmon generator 62 and the magnetic pole 52 will be detailed later.

The write head 28 further includes two coupling portions 53A and 53B embedded in the clad layers 85, 86 and 87 at positions away from the medium facing surface 12a. The coupling portions 53A and 53B are each made of a soft magnetic material. The coupling portions 53A and 53B are located on opposite sides of the core 61 in the track width direction TW, each at a distance from the core 61. The bottom surfaces of the coupling portions 53A and 53B are in contact with the top surface of the return yoke layer 51.

The write head 28 further includes a coupling layer 54 embedded in the clad layer 87. The coupling layer 54 is made of a soft magnetic material. The coupling layer 54 is disposed over the coupling portions 53A and 53B. The bottom surface of the coupling layer 54 is in contact with the top surfaces of the coupling portions 53A and 53B.

The write head 28 further includes: an insulating layer 88 disposed around the magnetic pole 52 and the coupling layer 54; an insulating layer 89 disposed on the insulating layer 88; a coil 60 disposed on the insulating layer 89; and an insulating layer 90 covering the coil 60. The coil 60 is planar spiral-shaped and wound around the coupling layer 54. The coil 60 produces a magnetic field corresponding to data to be written on the hard disk medium 100. The coil 60 is made of a conductive material such as copper.

The write head 28 further includes a yoke layer 55. The yoke layer 55 is disposed over the magnetic pole 52, the insulating layer 90 and the coupling layer 54. The yoke layer 55 is in contact with the top surface of the magnetic pole 52 at a position near the medium facing surface 12a, and in contact with the top surface of the coupling layer 54 at a position away from the medium facing surface 12a. The yoke layer 55 is made of a soft magnetic material.

In the write head 28, a magnetic path for passing a magnetic flux corresponding to the magnetic field produced by the coil 60 is formed by the return yoke layer 51, the coupling portions 53A and 53B, the coupling layer 54, the yoke layer 55, and the magnetic pole 52. The magnetic pole 52 has an end face located in the medium facing surface 12a, allows the magnetic flux corresponding to the magnetic field produced by the coil 60 to pass, and produces a write magnetic field.

Figure 23:
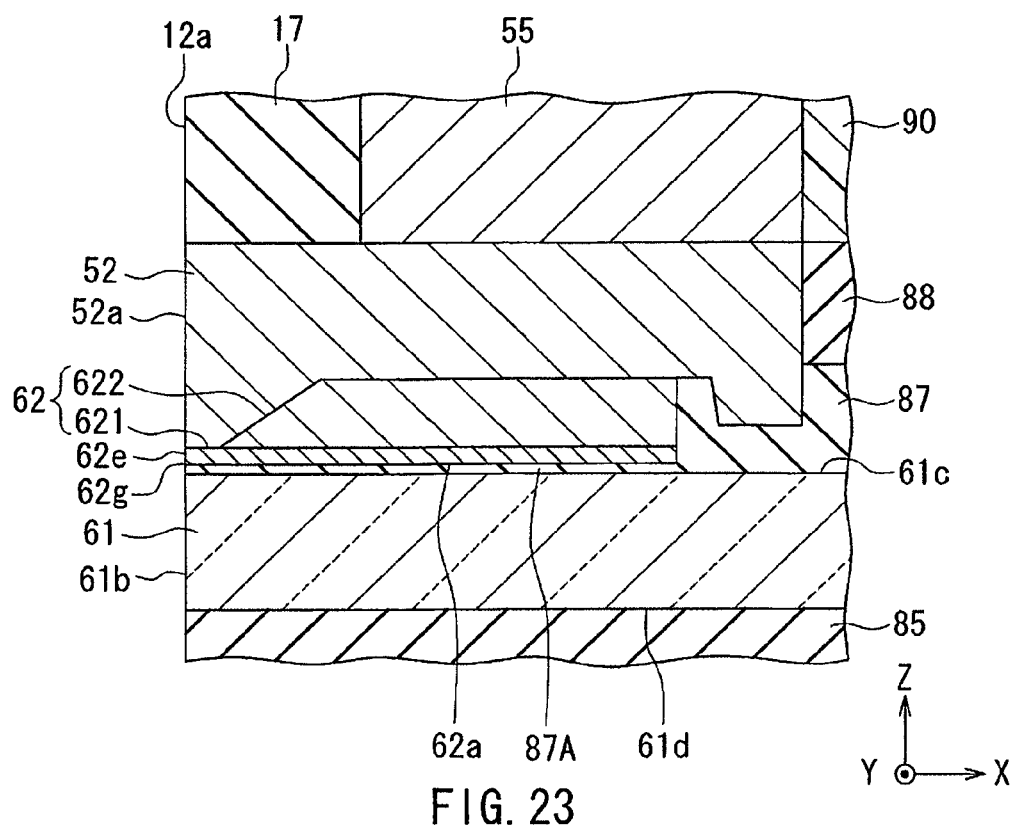
FIG. 23 is cross-sectional view of a main part of a magnetic head of a third embodiment of the invention.
Figure 24:
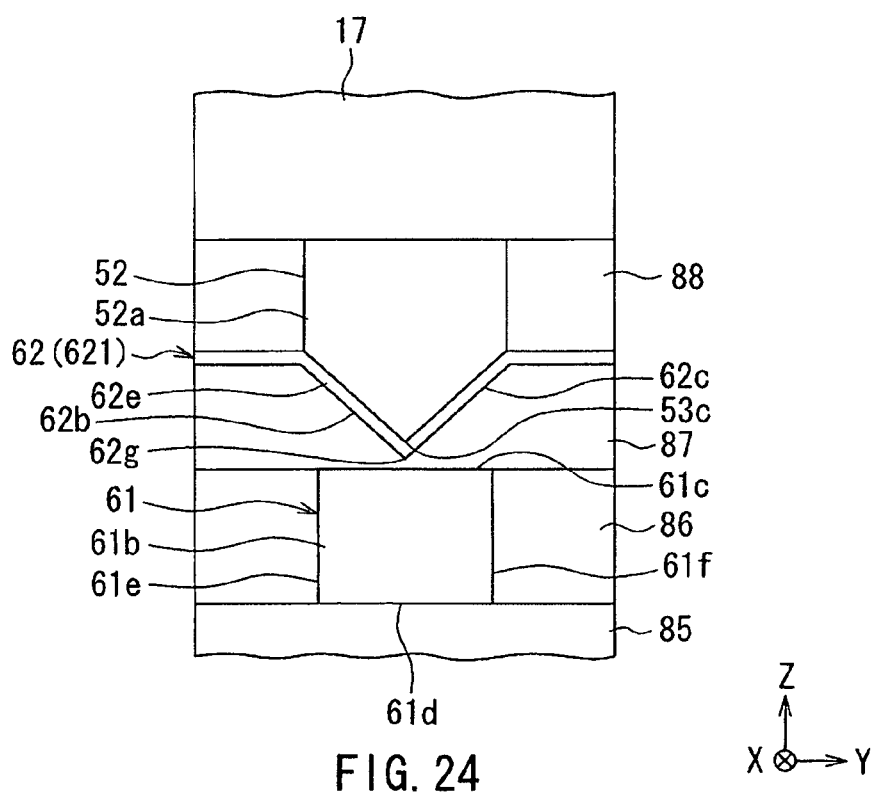
FIG. 24 is a front view of the main part of the magnetic head of the third embodiment of the invention.

Reference is now made to FIG. 23 and FIG. 24 to describe the configurations and arrangement of the core 61, the plasmon generator 62, and the magnetic pole 52. FIG. 23 is a cross-sectional view of a main part of the magnetic head of the present embodiment. FIG. 24 is a front view of the main part of the magnetic head of the present embodiment.

In addition to the incidence end 61a shown in FIG. 25, the core 61 has a front end face 61b located the medium facing surface 12a, an evanescent light generating surface 61c or a top surface, a bottom surface 61d, and two side surfaces 61e and 61f, as shown in FIG. 23 and FIG. 24. The evanescent light generating surface 61c generates evanescent light based on the light propagating through the core 61.

The plasmon generator 62 has an outer surface including a plurality of portions described below, and a near-field light generating edge 62g located in the medium facing surface 12a. As shown in FIG. 23, the outer surface of the plasmon generator 62 includes a propagative edge 62a. The propagative edge 62a faces the evanescent light generating surface 61c with a predetermined distance therefrom, and extends in the direction perpendicular to the medium facing surface 12a. The propagative edge 62a propagates plasmons. The near-field light generating edge 62g lies at an end of the propagative edge 62a.

As shown in FIG. 23, the part of the clad layer 87 interposed between the evanescent light generating surface 61c and the propagative edge 62a forms a buffer part 87A having a refractive index lower than that of the core 61.

As shown in FIG. 24, the outer surface of the plasmon generator 62 further includes a first inclined surface 62b and a second inclined surface 62c that are each connected to the propagative edge 62a and that increase in distance from each other with increasing distance from the propagative edge 62a.

As shown in FIG. 23 and FIG. 24, the outer surface of the plasmon generator 62 further includes a front end face 62e located in the medium facing surface 12a. The front end face 62e has a bottom end located at an end of the propagative edge 62a. The bottom end constitutes the near-field light generating edge 62g.

The plasmon generator 62 has a first portion 621 including a V-shaped portion. The V-shaped portion extends in the direction perpendicular to the medium facing surface 12a (the X direction). The V-shaped portion is V-shaped in cross section parallel to the medium facing surface 12a. The bottom end part of the V-shaped portion constitutes the propagative edge 62a. The plasmon generator 62 further has a second portion 622 located away from the medium facing surface 12a and accommodated in the V-shaped portion.

A part of the magnetic pole 52 is accommodated in the space defined by the V-shaped portion of the first portion 621 of the plasmon generator 62. The magnetic pole 52 has an end face 52a located in the medium facing surface 12a.

In the present embodiment, unlike the first embodiment, the magnetic pole 52 is disposed backward along the direction D1 of movement of the high-temperature region HT (i.e., disposed on the trailing end side) relative to the plasmon generator 62 serving as the heating element and the light generating element. Therefore, in the present embodiment, the magnitude Hz of the write magnetic field at any position in the first adjacent region R1 is equal to or less than the magnitude Hz of the write magnetic field at the boundary position between the first adjacent region R1 and the second adjacent region R2. Accordingly, in the present embodiment, if the magnitude Hz of the write magnetic field is 3 kOe or smaller at the boundary position between the first adjacent region R1 and the second adjacent region R2, the magnitude Hz of the write magnetic field applied to at least one magnetic grain 104a adjacent to the rear end HTE is 3 kOe or smaller.

The remainder of configuration, function and effects of the present embodiment are similar to those of the first embodiment.

Fourth Embodiment

Figure 26:
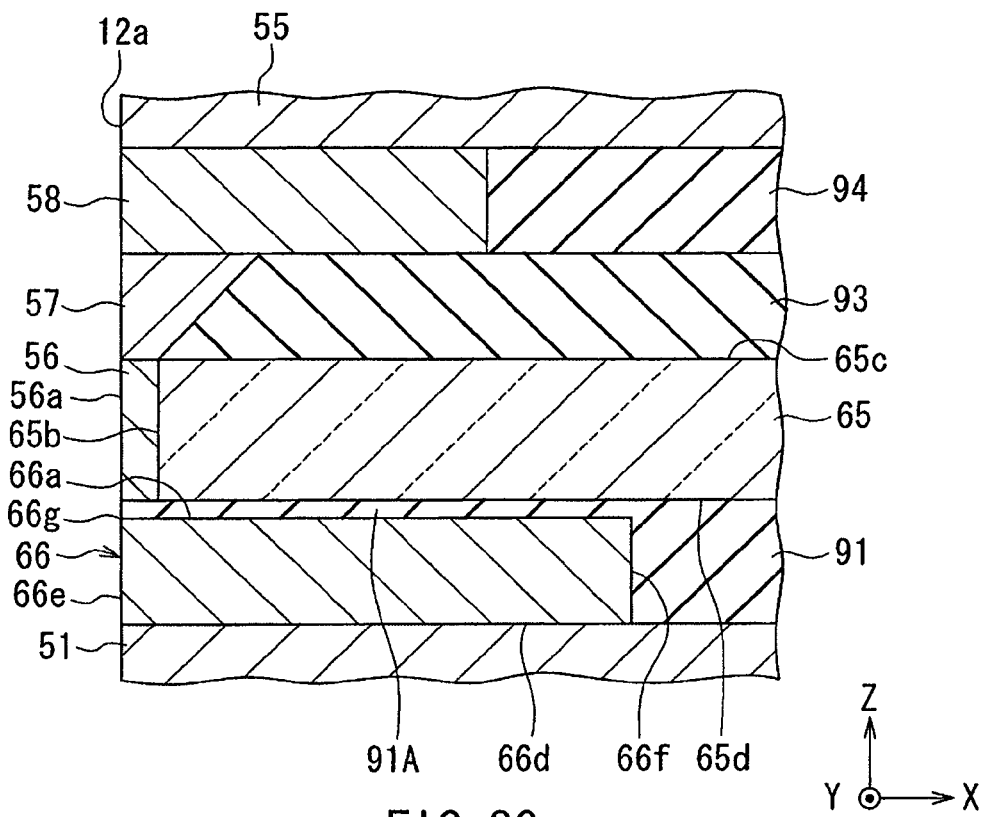
FIG. 26 is a cross-sectional view of a main part of a magnetic head of a fourth embodiment of the invention.
Figure 27:
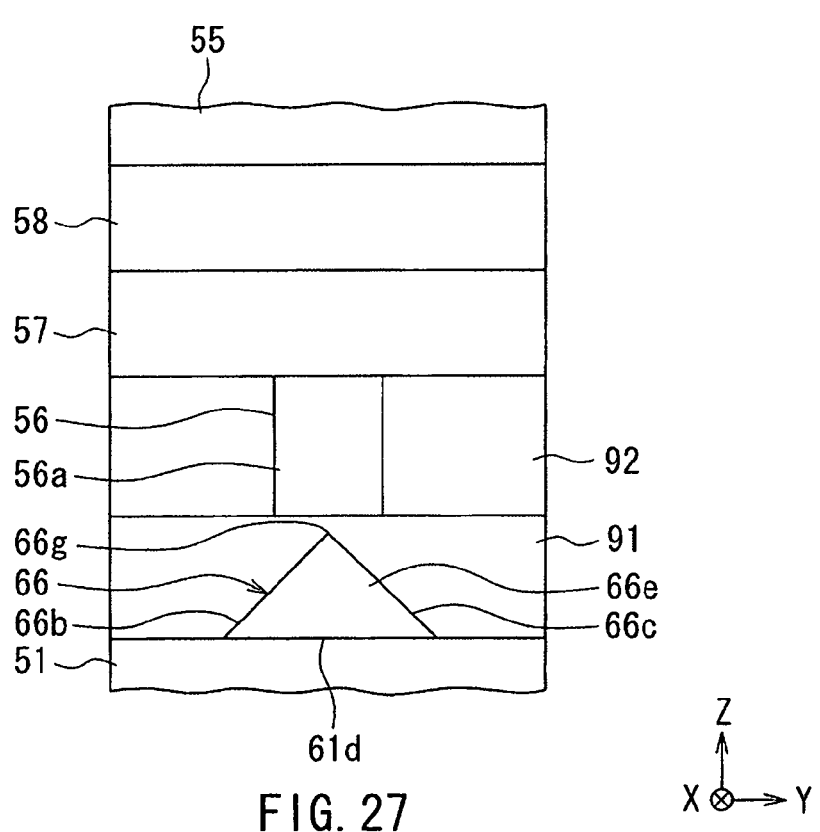
FIG. 27 is a front view of the main part of the magnetic head of the fourth embodiment of the invention.
Figure 28:
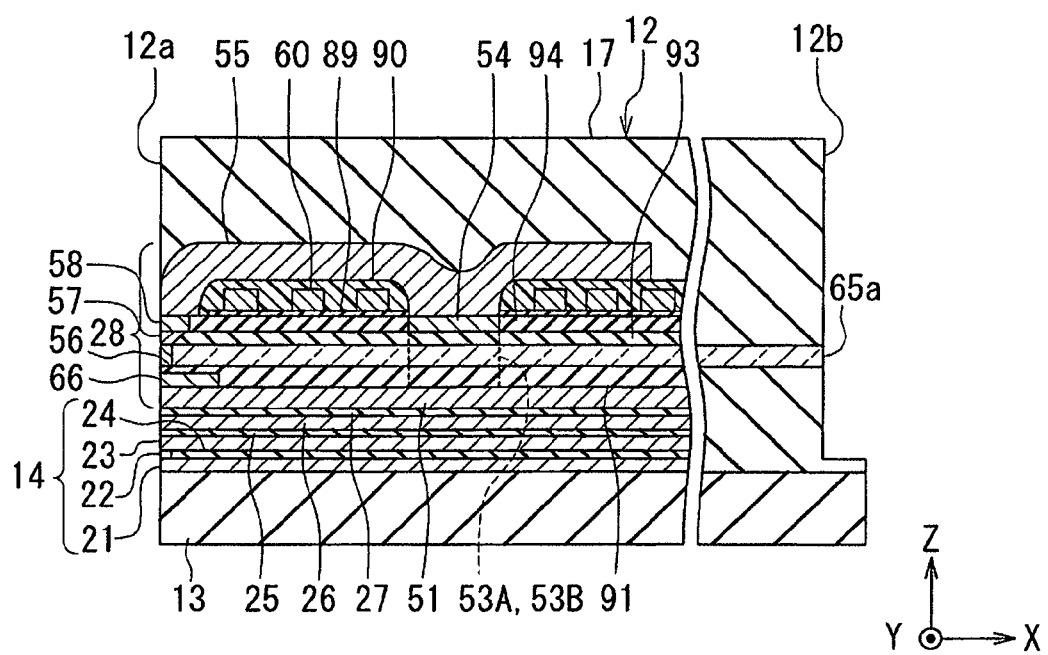
FIG. 28 is a cross-sectional view of the magnetic head of the fourth embodiment of the invention.

A fourth embodiment of the present invention will now be described with reference to FIG. 26 to FIG. 28. FIG. 26 is a cross-sectional view of a main part of a magnetic head of the present embodiment. FIG. 27 is a front view of the main part of the magnetic head of the present embodiment. FIG. 28 is a cross-sectional view of the magnetic head of the present embodiment.

The write head 28 of the present embodiment is different from the write head 28 of the third embodiment in the following respects. The write head 28 of the present embodiment has a magnetic pole 56, a core 65, a plasmon generator 66, clad layers 91, 92 and 93, and an insulating layer 94, instead of the magnetic pole 52, the core 61, the plasmon generator 62, the clad layers 85, 86 and 87, and the insulating layer 88 of the third embodiment.

The plasmon generator 66 is disposed on the return yoke layer 51. The clad layer 91 is disposed to cover the return yoke layer 51, the plasmon generator 66, and the not-shown insulating layer that is disposed around the return yoke layer 51.

The magnetic pole 56 and the core 65 are both disposed on the clad layer 91. The clad layer 92 is disposed around the magnetic pole 56 and the core 65 on the clad layer 91. The top surfaces of the magnetic pole 56, the core 65 and the clad layer 92 are even with each other. As shown in FIG. 26 and FIG. 27, the magnetic pole 56 has an end face 56a located in the medium facing surface 12a, and a rear end face opposite to the end face 56a. The end face 56a is rectangular in shape, for example.

The core 65 extends in the direction perpendicular to the medium facing surface 12a (the X direction). As shown in FIG. 26 to FIG. 28, the core 65 has an incidence end 65a, a front end face 65b that is closer to the medium facing surface 12a, a top surface 65c, an evanescent light generating surface 65d or a bottom surface, and two side surfaces (not shown). The evanescent light generating surface 65d generates evanescent light based on the light propagating through the core 65. The front end face 65b of the core 65 is in contact with the rear end face of the magnetic pole 56. The core 65 propagates laser light that is emitted from the laser diode 160 and incident on the incidence end 65a.

The plasmon generator 66 is disposed below the magnetic pole 56 and the core 65 in the vicinity of the medium facing surface 12a. The plasmon generator 66 has an outer surface including a plurality of portions described below, and a near-field light generating edge 66g located in the medium facing surface 12a. As shown in FIG. 26, the outer surface of the plasmon generator 66 includes a propagative edge 66a. The propagative edge 66a faces the evanescent light generating surface 65d with a predetermined distance therefrom, and extends in the direction perpendicular to the medium facing surface 12a. The propagative edge 66a propagates plasmons. The near-field light generating edge 66g lies at an end of the propagative edge 66a.

As shown in FIG. 26, the part of the clad layer 91 interposed between the evanescent light generating surface 65d and the propagative edge 66a forms a buffer part 91A having a refractive index lower than that of the core 65.

As shown in FIG. 27, the outer surface of the plasmon generator 66 further includes a first inclined surface 66b and a second inclined surface 66c that are each connected to the propagative edge 66a and that increase in distance from each other with increasing distance from the propagative edge 66a.

As shown in FIG. 26 and FIG. 27, the outer surface of the plasmon generator 66 further includes a bottom surface 66d that connects the respective bottom ends of the first inclined surface 66b and the second inclined surface 66c to each other, a front end face 66e located in the medium facing surface 12a, and a rear end face 66f opposite to the front end face 66e. The front end face 66e is triangular in shape. One of the vertexes of the front end face 66e is located at an end of the propagative edge 66a. This vertex constitutes the near-field light generating edge 66g. The bottom surface 66d is in contact with the top surface of the return yoke layer 51.

The write head 28 of the present embodiment further includes a coupling layer 57 disposed on the magnetic pole 56. The coupling layer 57 is made of a soft magnetic material. The coupling layer 57 has an end face located in the medium facing surface 12a. The clad layer 93 is disposed around the coupling layer 57 on the core 65 and the clad layer 92. The top surfaces of the coupling layer 57 and the clad layer 93 are even with each other.

The write head 28 of the present embodiment further includes a coupling layer 58 disposed over the coupling layer 57 the clad layer 93. The coupling layer 58 is made of a soft magnetic material. The coupling layer 58 has an end face located in the medium facing surface 12a. The insulating layer 94 is disposed around the coupling layer 58 on the clad layer 93. The top surfaces of the coupling layer 58 and the insulating layer 94 are even with each other. The yoke layer 55 is in contact with the top surface of the coupling layer 58 in the vicinity of the medium facing surface 12a.

In the present embodiment, the coupling portions 53A and 53B are embedded in the clad layers 91, 92 and 93. The coupling layer 54 is embedded in the insulating layer 94.

In the write head 28 of the present embodiment, a magnetic path for passing a magnetic flux corresponding to the magnetic field produced by the coil 60 is formed by the return yoke layer 51, the coupling portions 53A and 53B, the coupling layer 54, the yoke layer 55, the coupling layers 58 and 57, and the magnetic pole 56. The magnetic pole 56 has an end face located in the medium facing surface 12a, allows the magnetic flux corresponding to the magnetic field produced by the coil 60 to pass, and produces a write magnetic field.

The remainder of configuration, function and effects of the present embodiment are similar to those of the third embodiment.

The present invention is not limited to the foregoing embodiments, and various modifications may be made thereto. For example, possible configurations of the magnetic head are not limited to those shown in the foregoing embodiments, but any configuration may also be employed so long as it satisfies the requirements stipulated in the appended claims.

It is apparent that the present invention can be carried out in various forms and modifications in the light of the aforementioned descriptions. Accordingly, within the scope of the following claims and equivalents thereof, the present invention can be carried out in forms other than the aforementioned most preferable embodiments.

What is claimed is:

1. A thermally-assisted magnetic recording method for writing data on a hard disk medium by applying a write magnetic field and heat to the hard disk medium, the hard disk medium having a magnetic recording layer, the magnetic recording layer containing a plurality of magnetic grains and a grain boundary portion that is made of a nonmagnetic material and separates the plurality of magnetic grains from each other, the method comprising:
   a first step of forming a moving high-temperature region in the magnetic recording layer by applying the heat to part of the hard disk medium and moving a heat-receiving site in the hard disk medium, the high-temperature region being higher in temperature than a region therearound and having a temperature equal to or higher than a maximum value of coercivity vanishing temperatures of the plurality of magnetic grains, wherein at least one of the magnetic grains that is adjacent to a rear end of the high-temperature region in a direction of movement of the high-temperature region has a coercivity of a value other than 0; and
   a second step of applying the write magnetic field to the hard disk medium such that the write magnetic field applied to the at least one of the magnetic grains that is adjacent to the rear end of the high-temperature region is 3 kOe or smaller in magnitude.

2. The thermally-assisted magnetic recording method according to claim 1, wherein a maximum absolute value of a gradient of a change in coercivity of the magnetic recording layer with respect to a change in temperature falls within a range of 70 to 220 Oe/K.

3. The thermally-assisted magnetic recording method according to claim 2, wherein:
   the hard disk medium further includes a cap layer made of a ferromagnetic material, the cap layer having a coercivity vanishing temperature higher than the maximum value of the coercivity vanishing temperatures of the plurality of magnetic grains; and
   an extent of distribution of the coercivity vanishing temperatures of the plurality of magnetic grains is 60 K or smaller.

4. A thermally-assisted magnetic recording method for writing data on a hard disk medium by applying a write magnetic field and heat to the hard disk medium, the hard disk medium having a magnetic recording layer, the magnetic recording layer containing a plurality of magnetic grains and a grain boundary portion that is made of a nonmagnetic material and separates the plurality of magnetic grains from each other, the method comprising:
   a first step of irradiating the hard disk medium with light in order to apply the heat to part of the hard disk medium, and thereby forming a moving spot of the light on a surface of the hard disk medium; and
   a second step of applying the write magnetic field to the hard disk medium such that the write magnetic field applied to a predetermined position in the magnetic recording layer is 3 kOe or smaller in magnitude,
   wherein the predetermined position is at a distance from a position immediately below a center of the spot in the magnetic recording layer in a direction opposite to a direction of movement of the spot, the distance being expressed by MWW×(W1/W2)/2, where MWW is an effective track width of the hard disk medium, W1 is a diameter of the spot in a track direction, and W2 is a diameter of the spot in a track width direction.

5. The thermally-assisted magnetic recording method according to claim 4, wherein a maximum absolute value of a gradient of a change in coercivity of the magnetic recording layer with respect to a change in temperature falls within a range of 70 to 220 Oe/K.

6. The thermally-assisted magnetic recording method according to claim 5, wherein:
   the hard disk medium further includes a cap layer made of a ferromagnetic material, the cap layer having a coercivity vanishing temperature higher than a maximum value of coercivity vanishing temperatures of the plurality of magnetic grains; and
   an extent of distribution of the coercivity vanishing temperatures of the plurality of magnetic grains is 60 K or smaller.

7. A hard disk drive comprising a hard disk medium and a magnetic head, the hard disk medium having a magnetic recording layer, the magnetic recording layer containing a plurality of magnetic grains and a grain boundary portion that is made of a nonmagnetic material and separates the plurality of magnetic grains from each other, the magnetic head moving relative to the hard disk medium and writing data on the hard disk medium by thermally-assisted magnetic recording, wherein:
   the magnetic head includes a magnetic pole for applying a write magnetic field to the hard disk medium, and a heating element for applying heat to the hard disk medium;

the magnetic head applies heat to part of the hard disk medium using the heating element, and a heat-receiving site moves in the hard disk medium, whereby the magnetic head forms a moving high-temperature region in the magnetic recording layer;

the high-temperature region is higher in temperature than a region therearound and has a temperature equal to or higher than a maximum value of coercivity vanishing temperatures of the plurality of magnetic grains, and at least one of the magnetic grains that is adjacent to a rear end of the high-temperature region in a direction of movement of the high-temperature region has a coercivity of a value other than 0; and the magnetic head applies the write magnetic field to the hard disk medium using the magnetic pole such that the write magnetic field applied to the at least one of the magnetic grains that is adjacent to the rear end of the high-temperature region is 3 kOe or smaller in magnitude.

8. The hard disk drive according to claim 7, wherein a maximum absolute value of a gradient of a change in coercivity of the magnetic recording layer with respect to a change in temperature falls within a range of 70 to 220 Oe/K.

9. The hard disk drive according to claim 8, wherein:
the hard disk medium further includes a cap layer made of a ferromagnetic material, the cap layer having a coercivity vanishing temperature higher than the maximum value of the coercivity vanishing temperatures of the plurality of magnetic grains; and
an extent of distribution of the coercivity vanishing temperatures of the plurality of magnetic grains is 60 K or smaller.

10. The hard disk drive according to claim 7, wherein the heating element is an element that generates near-field light.

11. The hard disk drive according to claim 7, wherein the magnetic pole is disposed forward of the heating element along the direction of movement of the high-temperature region.

12. A hard disk drive comprising a hard disk medium and a magnetic head, the hard disk medium having a magnetic recording layer, the magnetic recording layer containing a plurality of magnetic grains and a grain boundary portion that is made of a nonmagnetic material and separates the plurality of magnetic grains from each other, the magnetic head moving relative to the hard disk medium and writing data on the hard disk medium by thermally-assisted magnetic recording, wherein:
the magnetic head includes a magnetic pole for applying a write magnetic field to the hard disk medium, and a light generating element that generates light for applying heat to the hard disk medium;
the magnetic head irradiates the hard disk medium with the light using the light generating element in order to apply heat to part of the hard disk medium, and thereby forms a moving spot of the light on a surface of the hard disk medium;
the magnetic head applies the write magnetic field to the hard disk medium using the magnetic pole such that the write magnetic field applied to a predetermined position in the magnetic recording layer is 3 kOe or smaller in magnitude; and
the predetermined position is at a distance from a position immediately below a center of the spot in the magnetic recording layer in a direction opposite to a direction of movement of the spot, the distance being expressed by MWW×(W1/W2)/2, where MWW is an effective track width of the hard disk medium, W1 is a diameter of the spot in a track direction, and W2 is a diameter of the spot in a track width direction.

13. The hard disk drive according to claim 12, wherein a maximum absolute value of a gradient of a change in coercivity of the magnetic recording layer with respect to a change in temperature falls within a range of 70 to 220 Oe/K.

14. The hard disk drive according to claim 13, wherein:
the hard disk medium further includes a cap layer made of a ferromagnetic material, the cap layer having a coercivity vanishing temperature higher than a maximum value of coercivity vanishing temperatures of the plurality of magnetic grains; and
an extent of distribution of the coercivity vanishing temperatures of the plurality of magnetic grains is 60 K or smaller.

15. The hard disk drive according to claim 12, wherein the light generating element is an element that generates near-field light.

16. The hard disk drive according to claim 12, wherein the magnetic pole is disposed forward of the light generating element along the direction of movement of the spot.

17. A hard disk medium for data to be written thereon by thermally-assisted magnetic recording, the hard disk medium comprising a magnetic recording layer and a cap layer, wherein:
the magnetic recording layer contains a plurality of magnetic grains, and a grain boundary portion that is made of a nonmagnetic material and separates the plurality of magnetic grains from each other;
a maximum absolute value of a gradient of a change in coercivity of the magnetic recording layer with respect to a change in temperature falls within a range of 70 to 220 Oe/K;
an extent of distribution of coercivity vanishing temperatures of the plurality of magnetic grains is 60 K or smaller; and
the cap layer is made of a ferromagnetic material and has a coercivity vanishing temperature higher than a maximum value of the coercivity vanishing temperatures of the plurality of magnetic grains.

* * * * *